United States Patent
Greiner et al.

(10) Patent No.: US 11,328,036 B2
(45) Date of Patent: May 10, 2022

(54) USING EMBEDDED ELEMENTS FOR ONLINE CONTENT VERIFICATION

(71) Applicant: Protected Media Ltd., Petach-Tikva (IL)

(72) Inventors: Asaf Greiner, Givat Shmuel (IL); Zac Sadan, Givat Shmuel (IL)

(73) Assignee: Protected Media Ltd., Petach-Tikva (IL)

( * ) Notice: Subject to any disclaimer, the term of this patent is extended or adjusted under 35 U.S.C. 154(b) by 0 days.

(21) Appl. No.: 16/901,201

(22) Filed: Jun. 15, 2020

(65) Prior Publication Data

US 2020/0311177 A1    Oct. 1, 2020

Related U.S. Application Data

(63) Continuation-in-part of application No. 15/873,945, filed on Jan. 18, 2018, now Pat. No. 11,170,412.

(51) Int. Cl.
*G06F 16/958* (2019.01)
*G06F 21/52* (2013.01)

(52) U.S. Cl.
CPC .......... *G06F 16/986* (2019.01); *G06F 21/52* (2013.01)

(58) Field of Classification Search
CPC ........ G06F 16/986; G06F 21/52; G06F 21/64; G06F 8/20; G06F 9/44526; G06F 9/44589; G06F 9/45512; G06Q 30/0226; G06Q 30/0239; G06Q 30/0619; G06Q 10/087; G06Q 30/0275; G06Q 30/0207–0277
See application file for complete search history.

(56) References Cited

U.S. PATENT DOCUMENTS 9,865,005 B1 * 1/2018 Pottjegort .............. G06Q 30/02
2007/0255821 A1   11/2007 Ge et al.
(Continued)

FOREIGN PATENT DOCUMENTS

WO    WO 2019/142183    7/2019

OTHER PUBLICATIONS

International Search Report and the Written Opinion dated Apr. 26, 2019 From the International Searching Authority Re. Application No. PCT/IL2019/050058. (12 Pages).
(Continued)

*Primary Examiner* — Chinyere Mpamugo

(57) ABSTRACT

Provided herein are systems, methods and devices for classifying nested content execution loaded by a webpage or an application executed by a client device, comprising a client device executing a webpage or an application loaded from a content server which embed nesting element(s) used for loading nested content from nested content server(s). The webpage/application embeds a host monitoring code executed to collect session data indicative of execution session of the webpage/application including execution of nested content loaded using the nesting element(s), transmitting a signature of the session data to server(s) configured to classify the execution according to at least part of the session data extracted from the signature, and transmitting transaction indicator(s) of execution of the nested content to one or more providers of the nested content which may verify execution of the nested content in the context of the webpage/application based on the classification obtained from the server(s).

15 Claims, 8 Drawing Sheets

(56) References Cited

U.S. PATENT DOCUMENTS

| | | |
|---|---|---|
| 2013/0144987 A1 | 6/2013 | Johnson et al. |
| 2015/0095146 A1 | 4/2015 | Adjaoute |
| 2017/0024778 A1 | 1/2017 | Knapp et al. |
| 2017/0161778 A1 | 6/2017 | Jager et al. |
| 2017/0206567 A1* | 7/2017 | Sutton-Shearer ............................ G06Q 30/0277 |
| 2017/0249394 A1 | 8/2017 | Loeb et al. |
| 2018/0144368 A1 | 5/2018 | Kruisselbrink et al. |
| 2019/0116037 A1* | 4/2019 | Donaldson ............ H04L 9/3234 |
| 2019/0220905 A1 | 7/2019 | Greiner et al. |

OTHER PUBLICATIONS

Official Action dated Jun. 25, 2020 from the US Patent and Trademark Office Re. U.S. Appl. No. 16/430,456. (20 pages).
Restriction Official Action dated Mar. 6, 2020 From the US Patent and Trademark Office Re. U.S. Appl. No. 15/873,945. (10 pages).
Interview Summary Dated Feb. 3, 2021 From the US Patent and Trademark Office Re. U.S. Appl. No. 15/873,945. (2 Pages).
Advisory Action dated Mar. 9, 2021 From the US Patent and Trademark Office Re. U.S. Appl. No. 15/873,945. (4 Pages).
Official Action dated Dec. 16, 2020 From the US Patent and Trademark Office Re. U.S. Appl. No. 16/430,456. (10 Pages).
Official Action dated Dec. 16, 2020 From the US Patent and Trademark Office Re. U.S. Appl. No. 15/873,945. (10 Pages).

* cited by examiner

US 11,328,036 B2

1

USING EMBEDDED ELEMENTS FOR ONLINE CONTENT VERIFICATION

RELATED APPLICATION(S)

This application is a Continuation-In-Part (CIP) of U.S. patent application Ser. No. 15/873,945 filed on Jan. 18, 2018, the contents of which are all incorporated by reference as if fully set forth herein in their entirety.

FIELD AND BACKGROUND OF THE INVENTION

The present invention, in some embodiments thereof, relates to verifying compliance of online content according to serving rules and, more specifically, but not exclusively, to verifying compliance relating to nested content loaded to a webpage or an application according to serving rules where the nested content is loaded from a nested content server other than the content server providing the webpage or the application.

Online content consumed by client devices used by users has become a major means for data consumption a long time ago.

Moreover, due to its ability to accurately target specific market segments, specific applications and even individuals, online advertisement content is fast becoming the most powerful, most highly performing and hence the leading choice of many advertisers for deploying advertisement campaigns.

SUMMARY OF THE INVENTION

According to a first aspect of the present invention there is provided a computerized method of content verification, comprising using one or more processors of a server for:
   Receiving, over a network, a first data from a host monitoring code embedded in a webpage or an application loaded from a content server and executed by a client device. The host monitoring code is executed by the client device during an execution of the webpage or the application. The webpage or the application embeds one or more nesting elements used for loading nested content from one or more nested content servers. The first data is indicative of the execution.
   Receiving, over the network, a second data indicative of the execution from a guest monitoring code embedded in the nested content executed by the client device during the execution.
   Combining between the first data and the second data for a verification of compliance of the execution with one or more rules associated with the nested content.
   Initiating one or more actions according to an outcome of the verification.
Wherein the first data is not available to the guest monitoring code and the second data is not available to the host monitoring code.
   Deploying both the host monitoring code in the webpage or the application and the guest monitoring code in the nested content may overcome limitations which may be inherent to each of the embedded codes with respect to collecting session data indicative of the execution session. Analyzing the combined (aggregated) session data comprising the first data and the second data may enable constructing an enhanced and highly comprehensive view of the nested content presented to the user of the client device which may be difficult and possibly impossible to create

2 using only the second data received from the guest monitoring code detached from the first data. Such a comprehensive view may thus allow for a significantly improved compliance verification of the nested content. Moreover, embedding the host monitoring code in the webpage or the application assures that host monitoring code is loaded and executed immediately on load and execution of the webpage or the application. This may allow the host monitoring code to collect extensive session data (first data) for a significantly prolonged time duration starting from the very beginning of the execution session and continuing for as long as the webpage or the application are executed.

According to a second aspect of the present invention there is provided a system for content verification, comprising one or more processors of a server adapted to execute a code, the code comprising:
   Code instructions to receive, over a network, a first data from a host monitoring code embedded in a webpage or an application loaded from a content server and executed by a client device, the host monitoring code is executed by the client device during an execution of the webpage or the application, the webpage or the application embeds one or more nesting elements used for loading nested content from one or more nested content servers according to the first data which is indicative of the execution.
   Code instructions to receive, over the network, a second data indicative of the execution from a guest monitoring code embedded in the nested content executed by the client device during the execution.
   Code instructions to combine between the first data and the second data for a verification of compliance of the execution with one or more rules associated with the nested content.
   Code instructions to initiate one or more actions according to an outcome of the verification.
Wherein the first data is not available to the guest monitoring code and the second data is not available to the host monitoring code.

According to a third aspect of the present invention there is provided a computerized method of providing classification of an execution of a webpage or an application by a client device based on data collected during the execution, comprising using one or more processors of a client device for:
   Executing a webpage or an application loaded from a content server, the webpage or the application embeds one or more nesting elements used for loading nested content from one or more nested content servers, the webpage or the application embeds a host monitoring code.
   Executing the host monitoring code for:
      Collecting session data indicative of an execution of the webpage or the application; and
      Providing at least part of the session data to a Real Time Bid (RTB) code executed by the client device during the execution of the webpage or the application, the RTB module transmits the at least part of the session data to one or more automated bidders adapted to place one or more bids for purchasing one or more impressions for loading advertisement nested content using the one or more nesting elements, the one or more automated bidders may select the advertisement nested content according to the at least part of the session data.
   Taking advantage of industry standard biding mechanisms and/or implementations such as the RTB module for transferring the session data (or part thereof) to the automated bidder(S) may significantly simplify design, integration, deployment and/or execution of the host monitoring code. The collected session data may allow the AD serving system(s) to significantly improve the decision making process to determine whether or not to bid and/or purchase impression(s) for loading the nested content during a specific execution session, select which advertisement nested content to load, determine a price for bidding and/or purchasing the impression(s) and/or the like.

According to a fourth aspect of the present invention there is provided a computerized method of event driven transmittal of session data collected during an execution of a webpage or an application by a client device, comprising using one or more processors of a client device for:
Executing a webpage or an application loaded from a content server, the webpage or the application embeds one or more nesting elements used for loading nested content from one or more nested content servers, the webpage or the application embeds a host monitoring code.
Executing the monitoring code for performing the following in each of a plurality of iterations, each of the plurality of iterations is associated with a respective one of a plurality of session events predefined by one or more event rules:
Collecting session data indicative of an execution of the webpage or the application;
Detecting the respective session event during the execution which matches the one or more event rules; and
Transmitting the session data to a remote server over a network in response to the detection of the respective session event.

Continuously capturing and logging (storing) the session data may allow collecting a comprehensive session dataset which may be used to identify, characterize and/or classify attributes of the execution session. However, by transmitting the collected session data only in response to session events predefined by the event rules may significantly reduce the traffic of information between the host monitoring code and the server thus reducing network resources, for example, bandwidth, throughput and/or the like.

According to a sixth aspect of the present invention there is provided a client device for supporting classification of execution of nested content loaded by a webpage or an application executed by a client device, comprising one or more processors for executing a code. The code comprising:
Code instructions to execute a webpage or an application loaded from a content server, the webpage or the application embeds one or more nesting elements used for loading nested content from one or more nested content servers. The webpage or the application embeds a host monitoring code.
Code instructions to execute the host monitoring code. The host monitoring code comprising:
Code instructions to collect session data indicative of an execution session of the webpage or the application including execution of nested content loaded using the one or more nesting elements.
Code instructions to transmit a signature generated the session data to one or more servers configured to classify the execution of the nested content according to at least part of the session data extracted from the signature.
Code instructions to transmit one or more transaction indicators of execution of the nested content to one or more providers of the nested content.

According to a seventh aspect of the present invention there is provided a computerized method of classifying nested content execution loaded by a webpage or an application executed by a client device, comprising using one or more processors of a server for:
Receiving a signature of session data indicative of an execution session of a webpage or an application by a client device including execution of nested content loaded from one or more nested content servers using one or more nesting elements embedded in the webpage or the application. The signature is generated by a host monitoring code embed in the webpage or the application.
Extracting the session data from the signature.
Classifying the execution of the nested content according to the at least part of the session data.
Providing the nested content execution classification to one or more providers of the nested content.

According to an eighths aspect of the present invention there is provided a system for classifying nested content execution loaded by a webpage or an application executed by a client device, comprising one or more processors for executing a code, the code comprising:
Code instructions to receive a signature of at least some session data indicative of an execution session of a webpage or an application by a client device including execution of nested content loaded from one or more nested content servers using one or more nesting elements embedded in the webpage or the application. The signature is generated by a host monitoring code embed in the webpage or the application.
Code instructions to extract the session data from the signature.
Code instructions to classify the execution of the nested content according to the at least part of the session data.
Code instructions to provide the nested content execution classification to one or more providers of the nested content.

Monitoring execution of online nested content loaded by a webpage and/or an application, notifying in real-time of the nested content execution to their providers and providing the session data to a server configured to classify the execution in real time and make it available to the nested content providers may significantly increase the ability of the providers to closely monitor, evaluate and verify, in real-time, the execution context of their nested content with respect to or more rules predefined and/or leaned for the respective nested content.

In a further implementation form of the first and/or second aspects, the verification of the compliance relates to one or more members of a group consisting of: legitimacy of the client device, reliability of the client device, appropriateness of webpage or the application for loading the nested content and visibility of the nested. Such a broad compliance verification targeting fraud probability (client device legitimacy and/or reliability), brand safety (appropriateness of webpage or the application) and visibility of the nested content may significantly improve the overall verification of the nested content thus enabling the nested content provider(s) to better evaluate performance of the nested content in order to improve serving the nested content in future execution session conducted by a plurality of client devices.

In a further implementation form of the first and/or second aspects, the host monitoring code is a script embedded in the webpage. The script is a member of a group consisting of: JavaScript and Flash script. Using industry standard implementation methods such as the JavaScript, the Flash script and/or the like may significantly reduce complexity for designing, integrating and/or deploying the host monitoring code into the webpage thus significantly reducing the effort, cost and/or time for embedding the host monitoring code in the webpage.

In a further implementation form of the first and/or second aspects, the host monitoring code is embedded in the application using a Software Development Kit (SDK). Proving the SDK for embedding, integrating and/or including the host monitoring code in the application may significantly reduce effort, cost and/or time required by the application vendor and/or developer to embed the host monitoring code in the application.

In a further implementation form of the first and/or second aspects, the nesting element is an iframe. Iframes are industry standard for loading nested content, for example, advertisement nested content such as, for example, an advertisement (AD), a promotion and/or the like into webpages and/or applications.

In a further implementation form of the first and/or second aspects, the host monitoring code assigns a unique identifier to the first data, the unique identifier indicates a respective execution of the webpage or an application at the client device, the unique identifier is reflected in the second data. Assigning the unique identifier may significantly improve simplicity and/or efficiency in correlating the collected session data with the specific execution session as well as correlating the specific execution session with its respective first and second data (datasets).

In a further implementation form of the first and/or second aspects, each of the first data and the second data comprise one or more attributes of a group consisting of: an attribute of the client device, an attribute of a user of the client device, an attributed of the webpage or the application, an attribute of interaction of the user with the webpage or the application, a presentation attribute of the webpage or the application, a presentation attribute of the nested content and an attribute of interaction of the user with the nested content. Collecting such a broad range and variety of attributes relating to the execution session may allow accurate identification, characterization and/or classification of the execution session (and optionally execution events), the client device, the user and/or the like.

In a further implementation form of the first and/or second aspects, the host monitoring code identifies one or more of the attributes by using one or more language processing tool to analyze content presented by the webpage or the application. Using language processing tools such as. For example, Natural Language Processing (NLP) tools may allow identification of a plurality of attributes of the online content presented by the webpage or the application, for example, a category, a genre, an essence, a meaning, a linguistic interpretation and/or the like.

In a further implementation form of the first and/or second aspects, the host monitoring code identifies the attribute(s) of the user based on data extracted from one or more local resource of the client device which is associated with the webpage or the application. Taking advantage of industry standard means used for storing user information, for example, a cookie and/or the like may significantly improve the capability of the host monitoring code to retrieve that user information.

In a further implementation form of the first and/or second aspects, the one or more actions comprise transmitting a notification to the one or more nested content servers in case, according to the outcome, the execution is incompliant with the one or more rules. Informing a provider of the nested content of compliance, and moreover of incompliance of the nested content as detected during one or more execution sessions may allow the nested content provider to evaluate performance of the nested content and improve serving the nested content in future execution session conducted by a plurality of client devices.

In an optional implementation form of the first and/or second aspects, a fraud score is calculated for the execution based on an analysis of one or more of the first data and the second data. Calculating the fraud score may allow detection of unreliable, impersonating and/or non-legitimate users and/or client devices. One or more automated system associated with the nested content provider(s) may analyze the fraud score in order to concentrate their efforts in execution sessions conducted by the reliable, legitimate and/or genuine users and/or client devices.

In an optional implementation form of the first and/or second aspects, the host monitoring code and the guest monitoring code communicate with each other using one or more communication protocols supported by a web browser executing the webpage or the application. The communication between the host monitoring code and the guest monitoring code may be used to initiate, in real time, one or more actions relating to the nested content. In particular, in case the verification determines the execution session to be at least partially incompliant with the rules, the nested content may be disabled, not presented (blocked), adjusted and/or the like.

In a further implementation form of the third aspect, the session data comprises one or more attributes of a group consisting of: an attribute of the client device, an attribute of a user of the client device, an attributed of the webpage or the application, an attribute of interaction of the user with the webpage or the application and a presentation attribute of the webpage or the application. Collecting such a broad range and variety of attributes relating to the execution session may allow accurate identification, characterization and/or classification of the execution session (and optionally execution events), the client device, the user and/or the like.

In an optional implementation form of the third aspect, the host monitoring code classifies one or more session events detected based on an analysis of the collected session data and provides the classification to the RTB module, the classification is done according to one or more predefined classification rules. Classifying the session execution and/or one or more session events according to the collected session data may further assist the AD serving system(s) to improve their decision making process.

In a further implementation form of the third aspect, the classification is provided to the RTB module by adjusting a Unified Resource Location (URL) address pointing to one or more content servers from which the webpage embedding the host monitoring code is loaded, the RTB module forwards the adjusted URL to the one or more automated bidders. By using the URL for transferring the collected session data (or part thereof) to the automated bidder, the RTB module may need little and potentially no alterations, adjustments and/or adaptations to support the session data transfer. This may significantly reduce effort, cost and/or time in integrating and/or deploying the host monitoring code in webpages or the applications.

In a further implementation form of the fourth aspect, the remote server classifies the respective session event according to a plurality of classification rules. Classifying the session execution and/or one or more session events according to the collected session data may further assist the AD serving system(s) to improve their decision making process.

In an optional implementation form of the fourth aspect, the remote server calculates a fraud score according to the classification and provides the calculated fraud score to one or more automated bidders adapted to place one or more bids for purchasing one or more impressions for loading the nested content using the one or more nesting elements, the fraud score is calculated according to the classification. Calculating the fraud score may allow detection of unreliable, impersonating and/or non-legitimate users and/or client devices. One or more AD serving system(s) may analyze the fraud score in order to concentrate their efforts in execution sessions conducted by the reliable, legitimate and/or genuine users and/or client devices.

In a further implementation form of the fifth, sixth, seventh and/or eights aspects, the one or more servers classify the execution session and/or one or more session events detected during the execution session based on an analysis of the collected session data extracted from the signature according to one or more classification rules. Applying the classification rules may establish a common basis for the classification server and the nested content providers which may be configured to provide an efficient classification that may be highly useful and informative to the providers.

In a further implementation form of the fifth, sixth, seventh and/or eighth aspects, the host monitoring code includes a unique identifier in the signature and in each of the one or more transaction indicators to correlate between the signature of the execution session and each of the one or more transaction indicators. Correlating between the notification of the nested content execution and the session execution may be essential for the providers of a certain bested content to deterministically indicate to the classification server of the relevant execution classification relating to the respective session corresponding to the session in which the respective nested content was executed.

In a further implementation form of the fifth, sixth, seventh and/or eighth aspects, in response to receiving one or more of the transaction indicators, one or more of the nested content providers obtain the execution classification from the one or more servers to verify proper execution of the nested content. The one or more nested content providers provide the unique identifier to the one or more servers to indicate the required execution session classification. The nested content providers may closely monitor, evaluate and verify, in real-time, the execution context of their nested content with respect to or more rules predefined and/or leaned for the respective nested content.

In a further implementation form of the fifth, sixth, seventh and/or eighth aspects, the execution verification relates to at compliance of the execution as reflected by the classification with one or more serving rules defined for the nested content. Using the serving rules, the nested content provider may evaluate appropriateness, performance and/or suitability of the nested content and improve serving the nested content in future execution session conducted by a plurality of client devices.

In a further implementation form of the fifth, sixth, seventh and/or eighth aspects, the host monitoring code transmits the one or more transaction indicators according to one or more communication protocols established with the one or more nested content providers. Employing industry standard communication protocols, specifically online content communication protocols may serve for simple and easy integration and adaption of the webpage and/or application as well as the servers and/or services used by the nested content provider(s) which may need little and potentially no alteration and/or adaptation to enable reception of the transaction indicator(s).

In a further implementation form of the fifth, sixth, seventh and/or eighth aspects, the one or more communication protocols comprise Video Ad Serving Template (VAST).

In a further implementation form of the fifth, sixth, seventh and/or eighth aspects, the one or more communication protocols comprise one or more web beacon.

In an optional implementation form of the fifth, sixth, seventh and/or eighth aspects, the host monitoring code encrypts the signature according to one or more cryptographic algorithms using one or more secret cryptographic keys. Encrypting the signature may significantly increase robustness and/or immunity of the signature to tampering by one or more malicious parties which may try to manipulate the signature in attempt to deceive the classification server and hence the nested content provider(s).

In a further implementation form of the fifth, sixth, seventh and/or eighth aspects, the session data comprises one or more attributes of a group consisting of: an attribute of the client device, an attribute of a user of the client device, an attribute of the webpage or the application, an attribute of interaction of the user with the webpage or the application and/or a presentation attribute of the webpage or the application. Collecting wide range and variety of attributes relating to the execution session may allow accurate identification, characterization and/or classification of the execution session and optionally of one or more execution events, the client device, the user and/or the like.

In a further implementation form of the fifth, sixth, seventh and/or eighth aspects, the one or more nesting elements comprise an iframe. Iframes are industry standard for loading nested content, for example, advertisement nested content such as, for example, an advertisement (AD), a promotion and/or the like into webpages and/or applications.

In a further implementation form of the fifth, sixth, seventh and/or eighth aspects, the host monitoring code is embedded in the webpage or the application using one or more Software Development Kits (SDK). Proving the SDK for embedding, integrating and/or including the host monitoring code in the application may significantly reduce effort, cost and/or time required by the application vendor and/or developer to embed the host monitoring code in the application.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
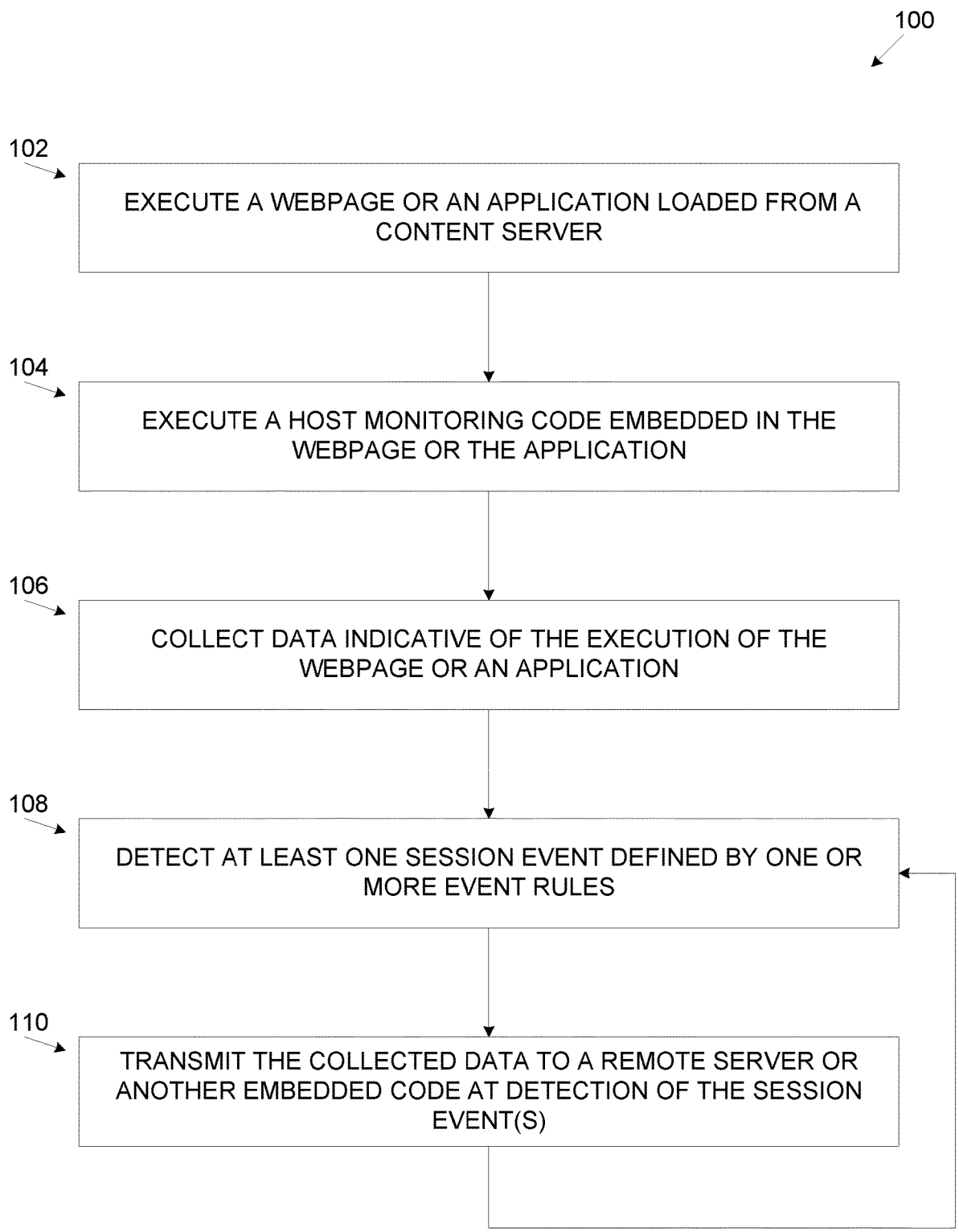
FIG. 1 is a flowchart of an exemplary process of collecting session data used for compliance verification of an execution of a webpage or application and transmitting the session data on detection of session events defined by event rules, according to some embodiments of the present invention.

The present invention, in some embodiments thereof, relates to verifying compliance of online content according to serving rules and, more specifically, but not exclusively, to verifying compliance relating to nested content loaded to a webpage or an application according to serving rules where the nested content is loaded from a nested content server other than the content server providing the webpage or the application.

According to some embodiments of the present invention, there are provided methods, systems and computer program products for verifying compliance of online content presented to one or more users using client devices with serving rules by analyzing content data collected by software modules (elements) embedded in the online content. In particular, the content compliance verification is intended for verifying compliance of execution sessions of comprising nested content loaded from one or more nested content servers into hosting content loaded from another content server.

The client devices, for example, a computer, a laptop, a desktop, a Smartphone, a tablet, a SmartTV, a personal helper device (e.g. Amazon Echo hosting Amazon Alexa) and/or the like may be used by users for consuming online content from one or more content servers associated with one or more content providers, i.e. publishers. The client device may execute the online content to create a presentation for the user using the client device, for example, a visual presentation presented through the display of the client device, an audible presentation presented through one or more audio interfaces of the client device and/or the like.

The online content, for example, a webpage(s) may be loaded (downloaded) from the publisher's content server(s) using, for example, a web browser which may locally execute the loaded webpage(s) to present the online content to the user thorough user interface(s) of the client device, for example, a display, an audio output and/or the like. The online content may also be presented to the user while the client device executes one or more applications, for example, a mobile application and/or the like which may load the online content from the publisher's content server(s) and present the loaded content to the user.

The online content may embed one or more nesting elements, for example, an iframe and/or the like which may be used for loading the nested content, for example, AD(s), additional data related to the hosting content, product description, service description and/or the like which may be selected according to the execution session of the online content consumption by the client device operated by the user. The nested content may be loaded from one or more nested content servers associated with one or more nested content providers. The nested content loaded into the online content is executed during the execution session of the online content.

A software module, designated herein after as host monitoring code, may be embedded in the webpage or the application using one or more implementations, techniques and/or methods. For example, in case of the webpage the host monitoring code may be embedded in the webpage as a script, for example, a JavaScript, a Flash script and/or the like such that the host monitoring code is executed by the client device during execution of the webpage. In case of the application, the host monitoring code may be embedded in the application using, for example, a Software Development Kit (SDK) comprising the host monitoring code and integrated with the application.

The host monitoring code may collect session data indicative of the execution session of the online content loaded and executed by the client device. The session data may include one or more attributes relating to the execution session, for example, an attribute of the client device, an attribute of the user, an attribute of the execution session, an attribute of a session event detected during the execution session, an attribute of the online content, an attribute of the nested content, an interaction of the user with the online content and/or the nested content and/or the like. The session data collected by the host monitoring code is designated herein after as first data. The host monitoring code may further assign a unique identifier to the first data in order to effectively correlate the first (session) data with a specific execution session by a specific client device. The host monitoring code may further identify one or more session events, for example, a session type, a client device type, an execution of a certain content element, a certain interaction of the user with the webpage or the application content and/or the like. The host monitoring code may collect the first data for one or more of the session events.

Another software module, designated herein after as guest monitoring code, may be embedded in the nested content, for example, advertisement nested content and/or the like using for example, an iframe, a JavaScript, a Flash script and/or the like such that the guest monitoring code is executed by the client device during execution of the nested content. Similarly to the host monitoring code, the guest monitoring code may also collect session data indicative of the execution session comprising the attributes relating to the execution session. The session data collected by the guest monitoring code is designated herein after as second data. The second data may include the same attributes as included in the first data. The second data may further include one or more additional attributes relating to the nested content, for example, an identification of the nested content, an identification of the nested content provider, an essence of the nested content, a presentation attribute of the nested content, interaction of the user with the nested content and/or the like. The guest monitoring code may further include in the second (session) data the unique identifier assigned by the host monitoring code to the first data in order to associate the first data and the second data with each other and to a specific execution session of the online content consumption by a specific client device.

The host monitoring code and the guest monitoring code may collect potentially similar session data (attributes) indicative of the execution session of the webpage or the application. However, the host monitoring code and the guest monitoring code may be executed in different contexts and therefore at least some of the session data available to one of the host monitoring code and the guest monitoring code may not be available to the other and vice versa. For example, due to security, privacy and/or integrity measures applied by the web browser or the application, the host monitoring code may have no and/or limited access to session data (attributes) of the nested content executing in the context of the nesting element, for example, the iframe. Such information on the other hand, may be available to the guest monitoring code executed in the context of the nesting element. In another example, the guest monitoring code executing in the context of the nesting element may not have access to session data relating to the webpage or the application and or to other nested content loaded into the webpage and/or the application.

The host monitoring code and the guest monitoring code may communicate with one or more remote servers, for example, a verification server over one or more networks and transmit the collected first data and second data to the verification server.

The verification server may aggregate, for example, combine between the first data and the second data to construct an overall, enhanced view of the execution session. Such enhanced view may naturally not be feasible using only one of the first data or the second data which since one or more of the first data or the second data may lack session data available in the other due to the different availability of the session data to the host monitoring code and the guest monitoring code.

The verification server may analyze the aggregated (session) data in order to verify compliance of the execution session of the online content, in particular with respect to the nested content according to one or more serving rules associated with the nested content.

The verification may be directed towards three main aspects of the execution session with respect to the nested content, specifically the advertisement nested content. The first verification objective relates to brand safety of a provider, seller and/or advertiser of products, services and/or the like offering his goods through the nested content, specifically, the advertisement nested content. Brand safety may be applied to avoid dilution of the brand, for example, avoid presentation of the advertisement nested content within inappropriate, irrelevant and/or otherwise improper online content. The second verification objective relates to visibility (view ability) of the advertisement nested content by the user using the client device to consume the online content. This verification may be applied to increase effectivity of the exposure of the advertisement nested content to the user by verifying that the advertisement nested content is properly presented by the client device and/or by the online content provider. The third verification objective relates to fraud detection in which the client device and/or the user may be evaluated to be legitimate devices and/or users respectively rather than a potentially malicious computing node impersonating as the desired/presented client device(s) and the users. Such malicious computing node(s) may be deployed to impersonate as legitimate devices and/or users to create a false appearance of the exposure of the advertisement nested content. For example, the advertiser(s) typically pay the publishers for impressions of the loaded advertisement nested content according to interaction event, for example, a selection, a click and/or the like made with the advertisement nested content. The malicious computing node(s) may thus employ one or more automated tools and/or software modules, for example, a robot, a bot, an emulator and/or the like to impersonate as legitimate users using legitimate client devices and clicking the presented advertisement nested content thus significantly increasing the interaction count and charging the advertiser for impressions of the advertisement nested content that was never presented to real users.

The serving rules may therefore be adapted according to the verification objectives and may therefore define, for example, online content suitability (e.g. relevancy, appropriateness, etc.) for presenting the nested content, client device suitability (e.g. type, display size, resolution, storage resources, computing resources, network resources, etc.) for presenting the nested content, suitability of the nested content for the user using the client device (e.g. age, gender, geographical location, etc.), visibility of the nested content (e.g. presentation area size, presentation area location, font size, obscurity, masked by other content, etc.) and/or the like.

Based on the compliance verification, the verification server may initiate one or more actions. For example, in case of incompliance with one or more of the serving rules, the verification server may transmit a notification to the nested content server(s) and/or to the nested content provider(s) indicating of the incompliance in the presentation of the nested content, for example, the nested content is present during an execution session conducted by a potentially malicious processing device, the nested content is presented within inappropriate online content, visibility of the nested content is at least partially insufficient and/or the like.

The verification server may further calculate a fraud score for the execution session. The fraud score may be calculated based on the first data and optionally on the aggregated data. The fraud score may reflect the probability of the user and/or the client device being reliable, genuine and/or and legitimate. For example, the fraud score may be calculated according to the type of the client device, according to one or more components applied at the client device (e.g. a bot, a robot, a virtual machine, a proxy server, etc.) which may be used under some constellations to impersonate as legitimate users by disguise the attributes of the user, the client device, the session and/or the like. In another example, the verification server may calculate the fraud score according to a verification that detected user interaction with the webpage or the application is genuinely initiated by the user rather than by an automated tool and/or application (e.g. a bot, a robot, etc.) impersonating as the user. This may be done by analyzing the first data which may include data indicative of interaction of the user with one or more user interfaces of the client device.

The remote server may optionally provide the fraud score to one or more AD serving systems, for example, an automated bidder, an AD exchange, a Demand Side Platform (DSP) used by the nested content server(s), a Sell Side Platform (SSP) used by the content server and/or the like. The AD serving system(s) may use the fraud score data to evaluate whether to bid and/or at what cost to bid for purchasing impression(s) for loading advertisement nested content.

Optionally, the host monitoring code and the guest monitoring code communicate with using one or more protocols supported by the webpage or the application. In such case, one or more actions relating to the nested content may be taken in real time, based on analysis of the first data and/or part thereof received from the host monitoring code. For example, the nested content may be prevented (blocked) from loading and/or presentation, the nested content may be partially presented, the nested content may be partially disabled (e.g. non clickable, etc.) and/or the like.

According to some embodiments of the present invention, the nested content, in particular, the advertisement nested content is loaded to the webpage or the application according to the session data (first data) collected by the host monitoring code. The advertisement nested content, for example, an advertisement (AD), a promotion and/or the like may be loaded from one or more advertisement nested content server(s) associated with one or more advertisers, for example, an advertisement agency, a seller, a distributor and/or the like.

The host monitoring code may transmit the collected session data (first data) to one or more Real Time Bidding (RTB) software (code) modules designated here in after as RTB module which may be embedded in the webpage or the application. The RTB module may assist in bidding and/or purchasing one or more impression of the advertisement nested content loaded using the nesting element(s) embedded in the webpage or the application. The RTB module(s) may transmit the first data to one or more AD serving systems, for example, the automated bidder, the AD exchange, the DSP, the SSP and/or the like. The AD serving system(s) may use the first data to bid for purchasing impression(s) for loading advertisement nested content selected based on analysis of the first data received from the host monitoring code through the RTB module(s).

According to some embodiments of the present invention, the host monitoring code transmits the first (session) data to the verification server which may classify the execution session and/or one or more of the session events detected during the execution session. Based on analysis of the received first data, the verification server may classify the session and/or the session event(s) according to classification rules which may be predefined and/or defined by a classification scheme set by one or more machine learning algorithms. The remote server may apply the machine learning algorithm(s) to a plurality of sessions and/or session events received during a plurality of execution sessions of the webpage or the application from a plurality of client devices.

The verification server may transmit the classification optionally with at least some of the first data to one or more of the AD serving systems. The AD serving systems may thus be used to bid for purchasing impression(s) for loading advertisement nested content selected according to the classification and optionally according to the first data and/or part thereof.

Optionally, transmission of the first data by the host monitoring code is event driven. The host monitoring code may transmit the session data (first data) in response to detection of one or more session events and/or conditions relating to the current content consumption session. The host monitoring code may detect the session events according to one or more predefined event rules. The event rules may define session events relating to, for example, the user, the client device, the execution session, interaction events initiated by the user with the webpage or the application and/or the like. In such case, the host monitoring code may store the session data and transmit it to the verification server only when a session event is detected. This may naturally be an iterative process where the host monitoring code stores the session data and in response to detection of a session event defined by the event rule(s) transmits, to the verification server, the session data accumulated since the last transmission (last event).

The verification of the online content according to the serving rules may present significant advantages over currently existing methods for verification of compliance of the nested content, specifically advertisement nested content.

Some of the existing verification methods may employ software modules such as the guest monitoring code embedded in the nested content and executed during execution of the nested content. However, as described herein above, such methods may present major limitations. First, the guest monitoring code may only start executing when the nested content is loaded and executed. In addition, the guest monitoring code executes in the context of the nesting element and therefore have limited and potentially no access to attributes of the execution session which may be highly indicative of the execution session, specifically with respect to the verification of compliance of the nested content. Deploying both the host monitoring code in the webpage or the application and the guest monitoring code in the nested content may overcome these limitations. By analyzing the aggregated session data comprising the first data and the second data, the verification server may construct an enhanced and highly comprehensive view of the nested content presented to the user of the client device and identify an overall presentation context relating to the nested content. Such a comprehensive view may be difficult and possibly impossible to create using only the second data received from the guest monitoring code detached from the first data. In addition, embedding the host monitoring code in the webpage or the application assures that host monitoring code is loaded and executed immediately on load and execution of the webpage or the application. This may allow the host monitoring code to collect extensive session data (first data) for a significantly prolonged time duration starting from the very beginning of the execution session and continuing for as long as the webpage or the application are executed. Such an extensive session data collected by the host monitoring code may be used by the verification server to determine the attributes, characteristics and/or parameters relating to the execution session. The extensive session data may be further used by the verification server to accurately classify the execution session and/or one or more of the session events taking place during the execution session.

Moreover, providing the session data collected by the host monitoring code to the AD serving system(s) may allow such systems to significantly improve the decision making process to determine whether or not to bid and/or purchase impression(s) for loading the nested content during a specific execution session, select which advertisement nested content to load, determine a price for bidding and/or purchasing the impression(s) and/or the like.

Furthermore, calculating the fraud score may allow detection of unreliable, impersonating and/or non-legitimate users and/or client devices. Using the calculated fraud score, the AD serving systems may concentrate their efforts in bidding and/or purchasing the impressions for execution sessions conducted by the reliable, legitimate and/or genuine users and/or client devices having low fraud scores while avoiding unreliable users and/or client devices having high fraud scores. This may significantly improve the performance of advertisement campaigns which may be focused on actual users, increase conversion rate, improve performance measurement of the ADs performance and/or the like.

In addition, applying the event driven transmission of the collected session data from the host monitoring code to the verification server may significantly reduce utilization of the network resources, for example, bandwidth, throughput and/or the like of the network over which the client device communicates with the verification server. Defining the event rules in an efficient manner may allow capturing the major session events while maintaining the low network bandwidth.

Also, preventing (blocking) in real time the advertisement nested content from being loaded and/or presented during the execution session may significantly improve brand safety of the advertised goods since presenting such advertisement nested content in conjunction with inappropriate, irrelevant and/or otherwise improper online content may be avoided. Moreover, the advertisement nested content may be prevented (blocked) in real time in case the web browser and/or the application are capable of AD blocking which may significantly reduce effectivity of the advertisement nested content. Furthermore, the advertisement nested content may be at least partially disable, for example, disable click operations for selecting the advertisement nested content, in case the client device is estimated not to be a legitimate client device thus preventing false clicks and significantly reducing false charges which may be otherwise applied on the provider of the advertisement nested content.

Finally, by selecting the nested content, in particular the advertisement nested content according to the classification of the execution session and/or the classification of the session events, the advertisement nested content may be accurately selected according to the profile, interests, preferences and/or the like of the user as well as according to the parameters, characteristics and/or if the client device thus significantly improving the advertisement campaign.

According to some embodiments of the present invention, there are provided methods, systems and computer program products for classifying in real-time execution of online content loaded by a webpage and/or an application executed by a client device, specifically with respect to execution of nested online content provided by one or more providers and loaded from one or more nested content servers. The classification may be then made available to the nested content provider(s) which are notified in real-time of the tested code execution and may verify compliance of online content execution with one or more of the serving rules.

The application executed by a client device may include, for example, Over the Top (OTT) application, a Connected TV (CTV) application and/or the like.

As described hereon before, the host monitoring code may collect session data relating to execution of the online content by the webpage and/or the application in particular with respect to execution of the nested online content loaded from one or more of the nested content servers and executed in the context of the webpage or the application.

The host monitoring code may transmit, in real-time, the session data to one or more remote servers, for example, a classification server, a verification server and/or the like which may classify the execution session based on analysis of at least part of the session data according to one or more of the classification rules. In particular, the host monitoring code may transmit the session data in form a compact, reduced size and volume signature which may significantly reduce the computing resources required to process and transmit the session data to the remote server.

The host monitoring code may optionally encrypt the signature.

The host monitoring code may transmit, in real-time, one or more transaction indicators indicting execution of the nested content to one or more providers of the nested content. In particular, the host monitoring code may transmit the transaction indications using one or more industry standard communication protocols, in particular online content communication protocols established between the client device and remote networked resources for online content delivery, for example, VAST, web beacon and/or the like.

In response to reception of the transaction indicator(s), one or more of the nested content providers may access the remote server(s) (e.g. classification server, verification server, etc.) and obtain the execution classification of the execution session which may be identified by the unique identifier included in both the transaction indicator(s) and the correlated signature. The nested content provider(s) may then evaluate and verify compliance of the execution of the nested content in the context of the webpage and/or the application with one or more of the serving rules predefined for the respective nested content.

The real-time classification of the execution of the nested content and making the execution classification available for verification by the nested content providers may present significant advantages and benefits.

First, moving the classification to the remote server(s) may significantly reduce complexity and foot print (storage space) of the host monitoring code and/or the computing resources required by the client device to execute the host monitoring code. As such, the host monitoring code may be deployed and integrated even in low-end client devices having limited computing resources.

Moreover, generating the signature to compactly include the session data may significantly reduce the size/volume of the session data thus significantly reducing the computing resources required by the client device to process and transmit the session data to the remote server(s).

Furthermore, transmitting the transaction indicators using the industry standard online content communication protocols may serve for simple and easy integration and adaption of the webpage and/or application as well as the servers and/or services used by the nested content provider(s) which may need little and potentially no alteration and/or adaptation to enable reception of the transaction indicator(s).

In addition, encrypting the signature may significantly increase robustness and/or immunity of the signature to tampering by one or more malicious parties which may try to manipulate the signature in attempt to deceive the remote server(s) and/or the nested content provider(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of collecting session data used for compliance verification of an execution of a webpage or application and transmitting the session data on detection of session events defined by event rules, according to some embodiments of the present invention. An exemplary process 100 may be executed by one or more client devices, for example, a SmartTV, a computer, a laptop, a desktop, a Smartphone, a tablet and/or the like used by their respective users to consume online content from one or more content servers associated with one or more content providers, i.e. publishers.

The client device 202 may be used by a user for consuming online content from one or more content servers associated with one or more content providers, i.e. publishers. The online content may include one or more webpages which may be loaded (downloaded) by the client device from the publisher(s)'s content server(s) using, for example, a web browser which may locally execute the webpage(s) to present the online content to the user. The online content may also be presented to the user while the client device executes one or more applications, for example, a mobile application and/or the like which may load the online content from the publisher(s)'s content server(s) and present the loaded content to the user.

The content loaded from the publisher(s)'s server(s) may embed one or more nesting elements, for example, an iframe and/or the like which may be used for loading nested content, for example, advertisement, additional data related to the hosting content, product description, service description and/or the like which may be selected according to the hosting content and/or part thereof. The nested content may be loaded from one or more nested content servers associated with one or more nested content providers.

The webpage or the application may further embed a host monitoring code, for example, a script, a JavaScript, a Flash script, a code segment and/or the like such that the host monitoring code is executed by the client device during the execution of the webpage code or the application. The host monitoring code may collect session data indicative of the webpage or the application loaded and executed by the client device, for example, attributes of the online content, attributes of the nesting element(s), attributes of the client device, attributes of the user, interaction of the user with the presented content and/or the like.

The host monitoring code may transmit the collected session data to one or more other embedded software modules and/or to one or more remote servers in response to detection of one or more session events detected during the execution session of the webpage or the application.

Figure 2:
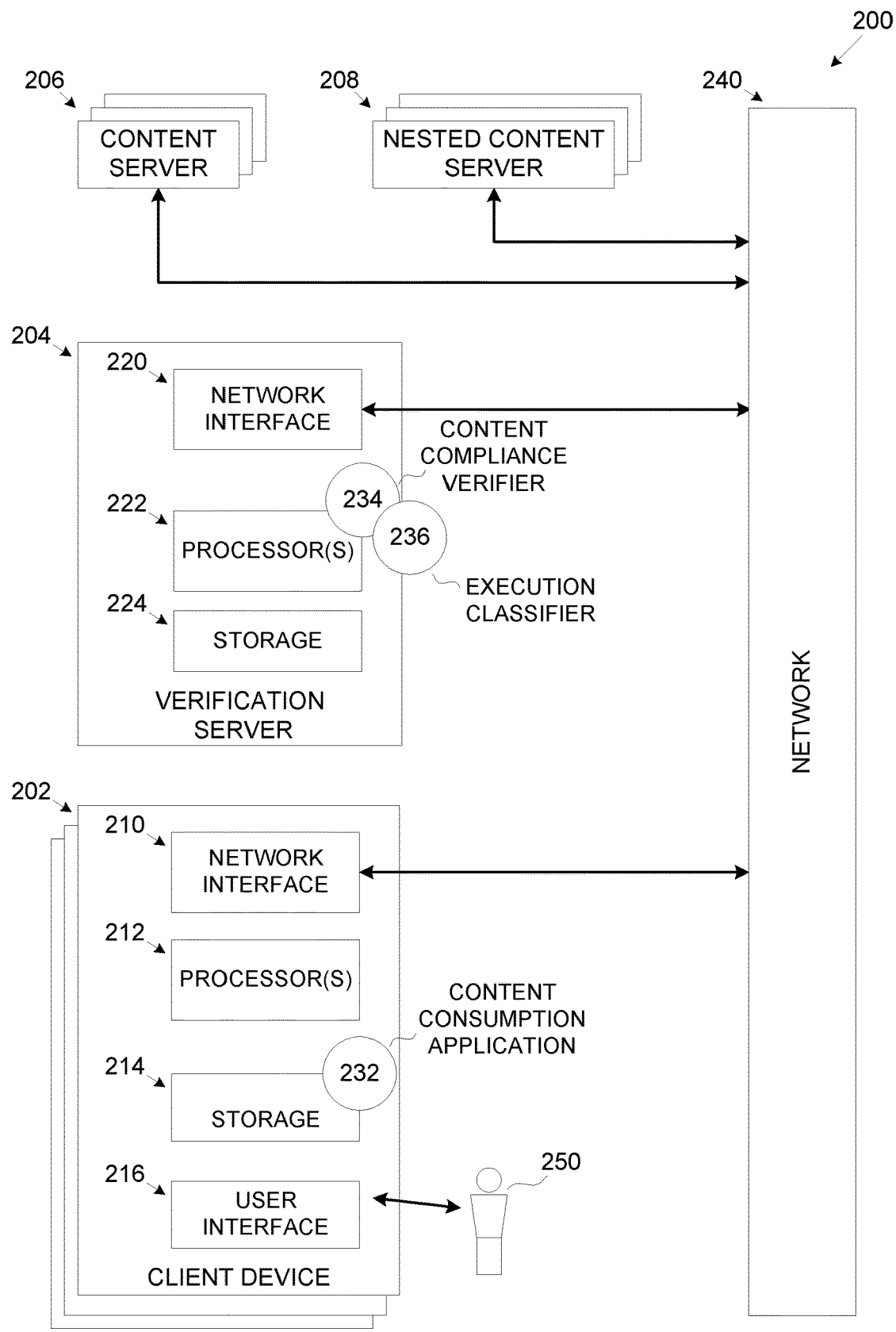
FIG. 2 is a schematic illustration of an exemplary system for collecting session data used for compliance verification of an execution of a webpage or application, according to some embodiments of the present invention, according to some embodiments of the present invention.

Reference is also made to FIG. 2, which is a schematic illustration of an exemplary system for collecting session data used for compliance verification of an execution of a webpage or application, according to some embodiments of the present invention.

An exemplary system 200 may include one or more client devices 202 associated with one or more users 250. The client devices 202 may communicate over a network 240 with one or more content servers 206 associated with one or more content providers, i.e. publishers. The client devices 202 may also communicate over the network 240 network 240 with one or more nested content servers 208 associated with one or more nested content providers, for example, an advertiser, an agency, an online data provider, an online data source and/or the like. One or more of the client devices 202 may further communicate over the network 240 with a remote verification server 204.

The network 240 may include one or more wired and/or wireless networks, for example, a Local Area Network (LAN), a Wide Area Network (WAN), a Personal Area Network (PAN), a Metropolitan Area Network (MAN), a cellular network, the internet and/or the like.

Each client device 202, for example, a computer, a laptop, a desktop, a Smartphone, a tablet, a SmartTV, a personal helper device (e.g. Amazon Echo hosting Amazon Alexa and/or the like may include a network interface 210 for connecting to the network 240, a processor(s) 212, a storage 214 and a user interface 216. The network interface 210 may provide one or more wired and/or wireless interfaces, for example, a LAN interface, a Wireless LAN (WLAN) (e.g. Wi-Fi) interface, a cellular network interface and/or the like for connecting to the network 240. The processor(s) 212, homogenous or heterogeneous, may be arranged for parallel processing, as clusters and/or as one or more multi core processor(s). The storage 214 may include one or more non-transitory persistent storage devices, for example, a Flash array, a hard drive, Solid State Disk (SSD) and/or the like. The storage 214 may further include one or more volatile memory devices, for example, a RAM device and/or the like.

The user interface 216 may include a one or more input/output (I/O) human-machine interfaces, for example, a keyboard, a pointing device, a touch surface, a display, a touch screen, a speaker, a microphone, an imaging sensor and/or the like for interacting with an associated user 250. The user interface 216 may be used to present the online content to the user 250 through one or more presentations modes, for example, a visual presentation, an audible presentation and/or the like. For example, a graphic user interface (GUI) may be presented to the 250 through the display of the client device 202. In another example, an audible presentation may be presented to the user 250 through the speaker(s) of the client device 202.

The user interface 216 may be further used to receive input from the user 250. For example, the user interface 216 may receive input from the user 250 through the touchscreen, the keyboard, the pointing device, the microphone and/or the like. In another example, the user interface 216 may include one or more imaging sensors which may capture one or more images depicting, for example, a hand gesture, an eye gaze, an eye blink and/or the like performed by the user 250 to indicate one or more pre-defined input patterns. The image(s) may be processed by the processor(s) 212 using one or more vision processing tools, algorithms and/or the like to identify the pre-defined input patterns initiated by the user 250.

The processor(s) 212 may execute one or more software modules, for example, a process, a script, an application, an agent, a utility, a tool and/or the like each comprising a plurality of program instructions stored in a non-transitory medium such as the storage 214 and executed by one or more processors such as the processor(s) 212.

For example, the processor(s) 212 may execute a content consumption application 204, for example, a web browser, a mobile application and/or the like which may load (download) the online content from the content server(s) 206 and/or the nested content server(s) 208 and execute the loaded content for presentation to the user 250. During execution by the processor(s) 212, the web browser may load code, for example, HTML code, Java Code, JavaScript code and/or the like of one or more webpages and execute the loaded code to generate the presentation (visual and/or audible) of the online content to the user 250 on the display and optionally through the speaker(s) of the client device 202. Similarly, while executed by the processor(s) 212, the application, for example, the web application, may load code, for example, HTML code, Java Code, JavaScript code and/or the like of online content and execute the code to generate the presentation of the content to the user 250.

The verification server may include a network interface 220, a processor(s) 222 and a storage 224. The network interface 220 may provide one or more interfaces, for example, a LAN interface, a cellular network interface and/or the like for connecting to the network 240. The processor(s) 222, homogenous or heterogeneous, may be arranged for parallel processing, as clusters and/or as one or more multi core processor(s). The storage 224 may include one or more non-transitory persistent storage devices, for example, a Flash array, a hard drive, an SSD and/or the like. The storage 214 may also include one or more volatile memory devices, for example, a RAM device and/or the like. The storage 224 may further comprise one or more network storage devices, for example, a storage server, a Network Accessible Storage (NAS), a network drive, and/or the like.

The processor(s) 222 may execute one or more software modules such as, for example, a process, a script, an application, an agent, a utility, a tool and/or the like from the storage 224. For example, the processor(s) 222 may execute a content compliance verifier 234 software module for verifying compliance of online content consumed by one or more of the client devices 202.

Optionally, the verification server 204 and/or the content compliance verifier 234 are implemented through one or more networked services and/or platforms, for example, a cloud service (e.g. Amazon Web Service (AWS), Google Cloud, Microsoft Azure, etc.), Software as a Service (SaaS), Platform as a Service (PaaS), Network as a Service (NaaS) and/or the like.

The process 100 is described for a single client device 202 loading (downloading) online content from a single content server 206 and a single nested content server 208. However, the description should not be construed as limiting since the verification server 204 may serve a plurality of client devices 202 which may each execute online content loaded from a plurality of content servers 206 and/or a plurality of nested content servers 208.

As shown at 102, the process 100 starts with the client device 202, in particular the content consumption application 232, for example, the web browser, the application (e.g. the mobile application) and/or the like loading (downloading) online content from the content server 206. The loaded content, for example, a webpage and/or online content presented by the mobile application may include code, for example, HTML code, Java Code, JavaScript code and/or the like. The web browser may execute the loaded code of the webpage to generate the webpage presentation at the display and optionally at the audio output interface(s) (e.g. the speaker(s)) of the client device 202. Similarly, the application may execute the loaded code to generate a presentation of the content at the display and optionally at the audio output interface(s) of the client device 202.

The online content loaded by the content consumption application 232 from the content server 206 may include one or more nesting elements, for example, an iframe, a banner, a window, a window segment and/or the like which may be used for loading nested content, for example, an advertisement (AD), additional data related to the presented content, product description, service description and/or the like from the nested content server 208.

As shown at 104, while executing the hosting content (i.e. the webpage or the application), the content consumption application 232 may execute a host monitoring code embedded in the loaded and executed webpage or the executed application. A plurality of implementation may be applied to embed the host monitoring code in the webpage or the application. In the case of the web browser executing the webpage, the host monitoring code may be embedded in the webpage as a script, for example, a JavaScript, a Flash script and/or the like. In the case of the application, the host monitoring code may be embedded in the application using, for example, an SDK comprising the host monitoring code and integrated in the application. The host monitoring code may typically be embedded in the webpage or the application by the content provider, i.e. the publisher of the hosting content using the content server 206 to serve the online content to the client device 202.

As shown at 106, the host monitoring code executed during the execution session of the webpage or the application may collect session data indicative of the current execution session of the webpage or the application by the content consumption application 232. The collected session data may include one or more attributes relating to the execution session, for example, an attribute of the client device 202, an attribute of the user 250, an attribute of the content loaded from the content server 206, an attribute of the nested content loaded from the nested content server 208, an attribute of the execution session, a presentation attribute of the content and/or the nested content, an interaction of the user 250 with the content and/or the nested content and/or the like.

The attributes relating to the client device 202 may include one or more operational parameters of the client device 202, for example, a type (e.g. a laptop, a desktop, a Smartphone, a tablet, a smart watch, a SmartTV, a personal helper device, etc.), a display size, a display resolution, availability of storage resources, availability of computing resources, availability of network resources, a current geographical location and/or the like. The host monitoring code may collect such operational parameters attributes by interacting with one or more services and/or software modules executed by the client device 202, for example, an Operating system (OS) service, a hardware management routine (e.g. device driver, etc.), a hardware monitor tool, the content consumption application 232 and/or the like. The host monitoring code may interact with such services and/or software modules using, for example, one or more Application Programming Interface (API) functions supported by the content consumption application 232.

The attributes relating to the user 250 may include one or more personal characteristics of the user 250 associated with the client device 202, for example, a gender, an age, a geographical place of origin, an interest, a content consumption history, a content consumption favorite(s) and/or the like. The host monitoring code may collect such personal characteristics by interacting with one or more services and/or data resources supported by the content consumption application 232. For example, the host monitoring code may access one or more data records stored by the client device 202 such as, for example, a cookie stored by the web browser or the application and comprising information describing activity of the user 250 with respect to the executed webpage or application. In another example, the host monitoring code may access one or more resources of the content consumption application 232 to retrieve the user attributes, for example, general data resource associated with the user 250, for example, a personal record such as, for example, a calendar, a task management record and/or the like. The host monitoring code may interact with such resources using, for example, one or more API functions supported by the content consumption application 232.

The attributes relating to the presented content may include one or more characteristics of the content loaded from the content server 206 and/or the nested content server 208, for example, a type of the content (e.g. a genre, category, etc.), a linguistic interpretation of the presented hosting content, an age restriction for consuming the hosting content, a presentation format of the hosting content (e.g. arrangement on the display, audio format, etc.), an AD blocking capability, a geographical location of the content server 206 and/or the nested content server 208 and/or the like. The host monitoring code may collect these characteristics by analyzing the hosting content using one or more analysis tools, for example, a visual and/or audible Natural Language Processing (NLP) tool and/or algorithm and/or the like which may be used to classify the hosting content to one or more classes according to one or more attributes of the content, for example, a category, a genre, a type, a language and/or the like. For example, by analyzing the hosting content, the host monitoring code may identify that the hosting content presents adult only content. In another example, based on the analysis, the host monitoring code may identify the hosting content comprises presentation information targeting one or more interests of one or more user 250, for example, a hobby such as, for example, gardening, driving, hiking, etc., a professional interest such as, for example, marketing, engineering, finance, etc., a shopping interest such as, for example, a fashion item, a vehicle, a home appliance, etc. and/or the like.

The attributes relating to the flow of the execution of the webpage or the application may include one or more parameters relating to the current execution session, for example, a counter counting the number of previous execution sessions in which the host monitoring code was executed and/or the like.

The attributes relating to presentation of the content and/or of the nested content may include one or more presentation attributes, for example, a size of presentation areas on the display of the client device 202, a location of the presentation areas on the display, a font size of text of the presented content and/or part thereof, an obscurity of the presented content and/or part thereof, a transparency of the presented content and/or part thereof, a color scheme of the presented content and/or part thereof, masking of objects by other objects, a volume of an audible presentation of the presented content and/or part thereof and/or the like. The presentation attributes may further include a determination made by the host monitoring code regarding whether the nested content is presented within a frame area visible to the user 250 on the display of the client device 202.

The interaction attributes may depict one or more interactions made by the user 250 with the webpage or the application, during the execution session, for example, an item selection, a text selection, a click on an item, a click on a link, a hover over an item, a text insert and/or the like. The host monitoring code may collect such interaction data by monitoring one or more interfaces, functions and/or services of the content consumption application 232, the OS and/or the like.

The host monitoring code may further verify the user interaction is genuinely initiated by the user 250 by monitoring the user interface 216 and associating between detected activity of the user 250 with the user interface(s) and detected interaction event(s) with the presented online content. To retrieve the activity information at the user interface 216, the host script may use one or more API functions and/or system calls to interact with one or more service and/or software modules controlling the user interface 216, for example, a device driver, an OS system call and/or the like. For example, assuming the host monitoring code detects a click action for selecting a certain item presented by the content consumption application 232 on the display of the client device 202. The host monitoring code may interact with the device driver of the pointing device of the client device 202, for example, a mouse, a touch screen, a touchpad and/or the like to associate between the detected selection of the item and the physical operation initiated by the user 250 with the user interface 216.

The host monitoring code may locally store (log) the collected session data which is as described indicative of the execution session of the content consumption application 232.

As shown at 108, the host monitoring code detects one or more session events taking place during the execution session of the content consumption application 232. The host monitoring code may detect the session event(s) according to one or more predefined event rules defining one or more session events. The event rules may define session events relating to, for example, the user 250, the client device 202, the execution session and/or interaction initiated by the user 250 with the content consumption application 232.

For example, a certain event rule may define a number of times the host monitoring code was previously executed by the content consumption application 232 on a certain client device since the time when the host monitoring code was deployed (embedded) in the webpage or the application. In such case, the host monitoring code may detect a session event in case the host monitoring code is executed for the number of times defined by the certain event rule, for example, the 3$^{rd}$ time.

In another example, a certain event rule may define a type of the client device. In such case, the host monitoring code may detect a session event in case the content consumption application 232 is executed by a certain client device 202 defined by the certain event rule, for example, a Smartphone.

In another example, a certain event rule may define one or more interaction operations initiated by the user 250, for example, selection of a certain item presented by the content consumption application 232 on the display of the client device 202. In such case, the host monitoring code may detect a session event in case the host monitoring code identifies the defined interaction operation(s) with the content consumption application 232.

In another example, a certain event rule may define a geographical location where the client device 202 is currently located while the content consumption application 232 is executed. In such case, the host monitoring code may detect a session event in case the client device 202 is currently located in a certain geographical location defined by the certain event rule, for example, London.

As shown at 110, in response to detection of one or more of the session events, the host monitoring code may transmit the collected session data indicative of the execution session of the content consumption application 232. The host monitoring code may transmit the session data to one or more other embedded software (code) modules embedded in the webpage or the application. Additionally and/or alternatively, the host monitoring code may transmit the session data to one or more remote servers, for example, the verification server 204.

The process 100 may be an iterative process in which the host monitoring code locally stores (logs) session data and transmits the stored session data upon detection of one or more of the session events defined by the event rule(s). This means that the session event(s) may trigger the transmission of the stored session data.

The host monitoring code may assign a unique identifier to the execution session of the content consumption application 232 and/or to one or more of the session events detected during the execution session. The host monitoring code may include the unique identifier in the session data. The host monitoring code 310 may optionally assign a unique identifier to each of a plurality of datasets of the session data where each of the datasets is transmitted upon the detection of one or more of the session events.

Optionally, the host monitoring code locally stores a data record, for example, a cookie and/or the like comprising the session data collected during one or more execution sessions of the content consumption application 232. The locally stored data record may be updated, refreshed and/or amended by the host monitoring code during one or more execution sessions of the content consumption application 232. The session data collected and stored during the plurality of content consumption sessions may be used to create a user model and/or profile for the user 250 which may be used to improve characterization of the user 250. The host monitoring code may optionally transmit the stored session data collected during the previous execution sessions of the content consumption application 232.

Optionally, the host monitoring code classifies the execution session and/or one or more of the session events according to one or more predefined classification rules. In particular, the host monitoring code may classify one or more of the session events which triggered the host monitoring code to transmit the session data (datasets). The host monitoring code may classify the session and/or the session event(s) to one or more classes, for example, a certain user, a certain session type, a certain session occurrence, a certain type of the client device 202, a certain interaction operation initiated by the user 250 and/or the like.

For example, a certain classification rule may dictate classification of a specific execution session to a certain user 250. The host monitoring code may analyze the collected session data to identify one or more attributes relating to a certain user 250 for example, one or more of the personal characteristics, interests, preferences and/or the like of the certain user 250.

In another example, a certain classification rule may dictate classification (or correlation) of a specific execution session to a certain device type of the client device 202. The host monitoring code may analyze the collected session data to identify the type of the client device 202.

In another example, a certain classification rule may dictate classification of a specific execution session according to a genre and/or a category of the online content. The host monitoring code may analyze the collected session data to identify the type of the genre and/or the category of the hosting content based on the characteristic(s) of the content loaded from the content server 206 which may be included in the session data.

In another example, a certain classification rule may dictate classification of the execution session to a certain number of execution sessions in which the online content was loaded from the content server 206 and executed by the content consumption application 232, in particular the number of sessions in which the host monitoring code was executed since deployed in the online content. The host monitoring code may identify the number of sessions during which the host monitoring code was executed based on data retrieved from the locally stored data record, for example, the cookie stored by the host monitoring code.

In another example, a certain classification rule may dictate classification of the execution session and/or one or more of the session events to one or more certain user interaction operations initiated by the user 250 for interacting with the content consumption application 232.

In some embodiments of the present invention, in particular in case the nested content includes advertisement content, the host monitoring code may transmit the collected session data to one or more other embedded software (code) modules, for example, an RTB module designated here in after as an RTB module that is embedded in the webpage or the application. The RTB module may assist in bidding and/or purchasing one or more impression of the advertisement nested content loaded by the content consumption application 234 using the nesting element(s) embedded in the webpage or the application.

Figure 3A:
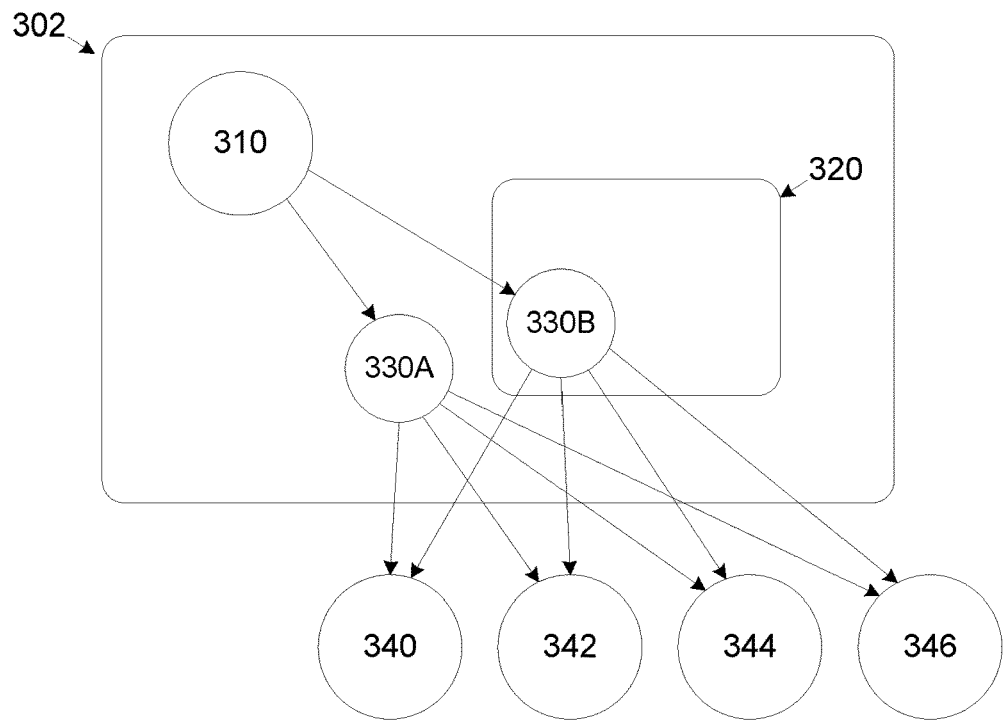
FIG. 3A is a schematic illustration of an exemplary embodiment of interaction between a host monitoring code and a Real Time Bidding (RTB) module, both embedded in a webpage or an application, according to some embodiments of the present invention.

Reference is now made to FIG. 3A, which is a schematic illustration of an exemplary embodiment of interaction between a host monitoring code and an RTB module, both embedded in a webpage or an application, according to some embodiments of the present invention. An exemplary online content, for example, a webpage 302 may be loaded from a content server such as the content server 206. The webpage 302 may include code executed by a content consumption application such as the content consumption application 232, for example, a web browser executed by a client device such as the client device 202 for generating a presentation for a user such as the user 250 at a display and optionally at an audio interface of the client device 202.

A host monitoring code 310 as described in the process 100 may be embedded in the webpage 302, typically by the content provider associated with the content server 206. The host monitoring code 310 may be embedded in the webpage 302 through one or more implementations, for example, a JavaScript, a Flash script, a script, a code segment and/or the like.

The webpage 302 may include one or more nesting elements 320, for example, an iframe and/or the like which may be used for loading nested content, for example, advertisement nested content such as, for example, an AD, a promotion and/or the like from one or more nested content servers such as the nested content server 208, specifically an advertisement nested content server 208. In such case the nesting element 320, for example, an AD space, a banner and/or the like may be used for loading one or more items of the advertisement nested content from the advertisement nested content server 208, i.e. one or more impressions.

The webpage 302 may further embed one or more RTB modules 330 which may be embedded in the webpage 302 through one or more implementations. For example, one or more of the RTB modules 330, for example, an RTB module 330A may be embedded in the webpage 302 as a JavaScript, as a Flash script, as a script, as a code segment and/or the like. In another example, one or more of the RTB modules 330, for example, an RTB module 330B may be embedded in an iframe in the webpage 302. The RTB module may communicate with one or more AD serving systems associated with the nested content server 208, for example, an automated bidder 340, an AD exchange 342, a DSP 344, an SSP 346 and/or the like.

The host monitoring code 310 may execute the process 100 for collecting the session data indicative of the execution session of the content consumption application 232. As described before, the collected session data comprises one or more of the attributes relating to the execution session of the content consumption application 232, for example, the attribute(s) of the client device 202, the attribute(s) of the user 250, the attribute(s) of the content loaded from the content server 206, the attribute(s) of the nested content loaded from the nested content server 208, the attribute(s) of a flow of the execution, the presentation attribute(s) of the content and/or the nested content, interaction of the user 250 with the content and/or the nested content and/or the like.

The host monitoring code 310 may transmit, transfer and/or provide the collected session data to the RTB module 330, for example, the RTB module 330A and/or the RTB module 330B. The host monitoring code 310 may employ one or more protocols, techniques and/or implementations, specifically RTB protocol(s) to transfer the session data to the RTB module 330. The session data transfer implementation may further depend on the specific content consumption application 232, for example, the web browser and/or the application to take advantage of the features, capabilities and/or provisions provided by each web browser and/or application to support efficient session data transfer between the host monitoring code 310 and the RTB module 330. Moreover, the measures applied to transfer the session data to the RTB module 340 may be designed, configured and/or deployed to be transparent to the user 250.

For example, assuming that, as known in the art, the RTB module 330 captures a Uniform Resource Locator (URL) address pointing to the webpage 302 and forwards the URL address line to the AD serving system(s). The host monitoring code 310 may adjust the URL address line to include the collected session data and/or part thereof. The URL address line adjustment may be transparent to the user 250 interacting with the content consumption application 232 such as the web browser. Thus, when the RTB module 330 extracts the URL address line and forwards it to the AD serving system(s), the session data (or part thereof) is included in the URL link. One or more of the AD serving systems may be adapted to identify and extract the session data added to the URL line.

In another example, one or more RTB protocols used to communicate with the RTB module as known in the art and/or the RTB module(s) 330 may be designed, adapted and/or adjusted to support reception of the session data from the host monitoring code 310.

Optionally, the host monitoring code 310 transmit (e.g. transfers, provides, etc.) to the RTB module 330 the classification of the execution session and/or the classification of one or more of the session events detected during the execution session.

One or more of the AD serving systems may use the session data (or part thereof) and/or the classification during the process of evaluation, assessment and/or decision making on whether to bid and/or purchase one or more impressions for loading the advertisement nested content to the webpage 302 using the embedded nesting element 320, at what price to bid and/or purchase the impression(s) and/or the like.

For example, assuming that based on the session data and/or the classification, the AD serving system(s) identify that a certain client device 202 is actually a computing node, for example, a server, a computer, a service and/or the like which impersonates as a plurality of client devices 202. In such case, the AD serving system(s) may determine that the certain client device 202 is not actually used by a user such as the user 250 and may actually be operated by one or more software modules, for example, a bot, a robot, a virtual machine, an emulator, a proxy and/or the like which impersonate as legitimate users 250 visiting the website 302. In such case the AD serving system(s) may further avoid biding and/or purchasing impressions at the website 302 for a specific execution session conducted by such a processing node.

In another example, assuming that based on the session data and/or the classification, the AD serving system(s) identify that for a certain client device 202, the user interaction with the content consumption application 232 is not genuinely initiated by a user and may potentially be initiated by one or more of the impersonating software modules, for example, the bot, the robot, the virtual machine, the emulator, the proxy and/or the like. In such case the AD serving system(s) may also avoid biding and/or purchasing impressions at the website 302 for a specific execution session conducted by the certain client device 202.

Moreover, the host monitoring code 310 may synchronize one or more of the attributes of the current session included in the session data transferred to the RTB module 330 before transferring the session data to the RTB module 330. This may allow the AD serving system(s) using the session data received from the RTB module 330 to efficiently identify and correlate the received session data with a specific session execution of the content consumption application 232 executed by a specific client device 202. For example, the host monitoring code 310 may apply cookie synching to synchronize the cookies associated with the specific client device 202, the specific user 250 and/or the specific execution session of the content consumption application 232.

In some embodiments of the present invention, the host monitoring code 310 may transmit the collected session data to one or more remote servers, for example, a verification server such as the verification server 204 executing a content compliance verifier such as the content compliance verifier 234. In particular, the host monitoring code 310 may transmit the session data upon detection of one or more of the session events defined by one or more of the predefined event rules.

Figure 3B:
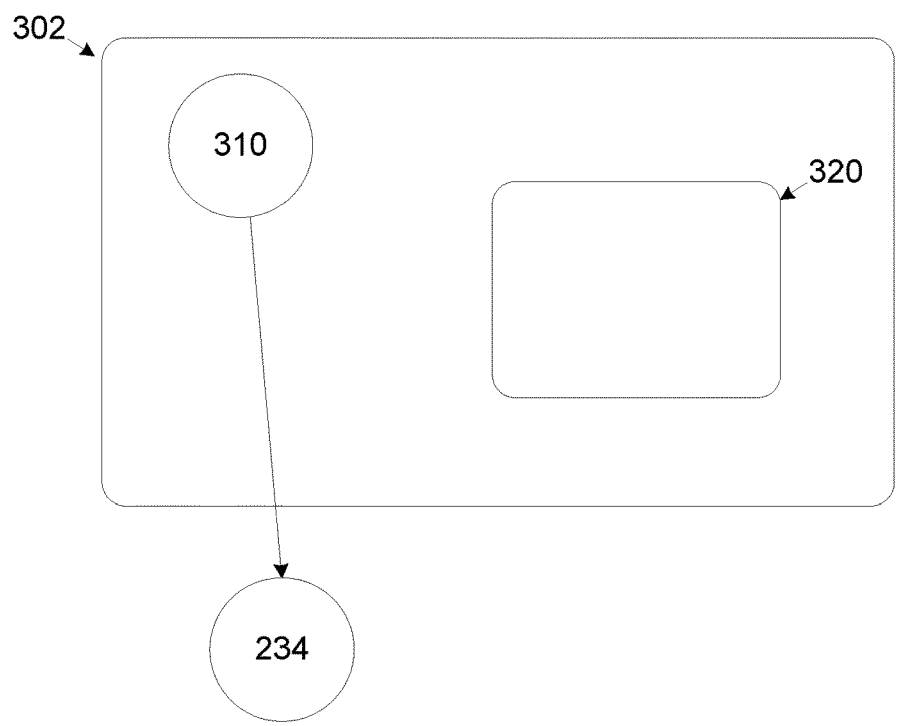
FIG. 3B is a schematic illustration of an exemplary embodiment of interaction between a host monitoring code embedded in a webpage or an application and a remote verification server, according to some embodiments of the present invention.

Reference is now made to FIG. 3B, which is a schematic illustration of an exemplary embodiment of interaction between a host monitoring code embedded in a webpage or an application and a verification application executed by a remote verification server, according to some embodiments of the present invention. An exemplary online content, for example, the webpage 302 may be loaded from a content server such as the content server 206. The webpage 302 may include code executed by a content consumption application such as the content consumption application 232, for example, a web browser executed by a client device such as the client device 202 for generating a presentation to a user such as the user 250 at a display and optionally at an audio interface of the client device 202. A host monitoring code such as the host monitoring code 310 may be embedded in the webpage 302. The host monitoring code 310 may collect the session data indicative of the execution session of the content consumption application 232.

The host monitoring code 310 may execute a process such as the process 100 for collecting the session data indicative of the execution session of the content consumption application 232.

The host monitoring code 310 may transmit, transfer and/or provide the collected session data to one or more remote servers, for example, a verification server such as the verification server 204 executing a content compliance verifier such as the content compliance verifier 234. In particular, the host monitoring code 310 may transmit the session data upon detection of one or more of the session events defined by one or more of the predefined event rules.

The host monitoring code 310 may optionally, before transmitting the session data to the content compliance verifier 234, perform synchronization of the session attributes, for example cookie synching to allow effective identification and correlation of the session data with the specific execution session of the specific content consumption application 232 by the specific client device 202.

Figure 4:
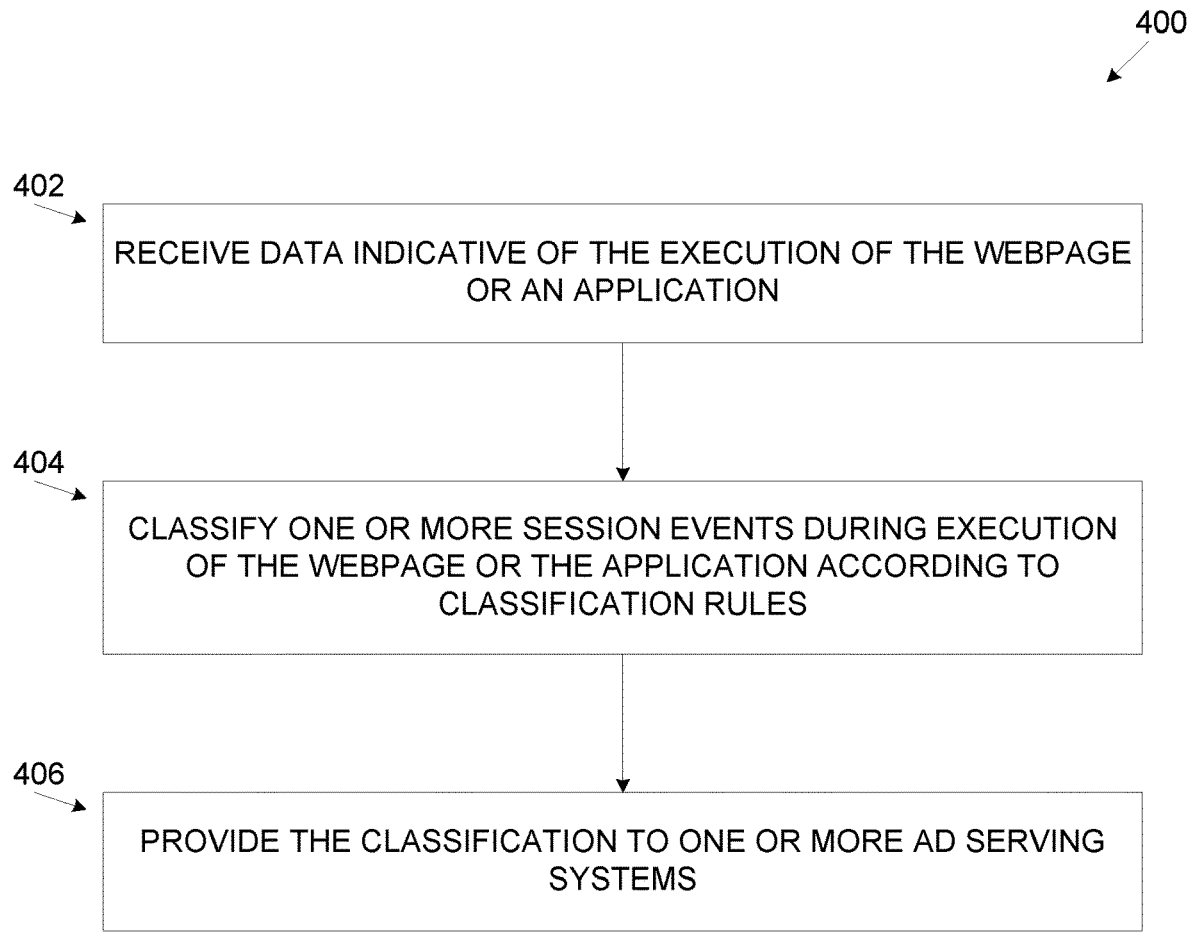
FIG. 4 is a flowchart of an exemplary process of classifying session events detected during execution of a webpage or application, according to some embodiments of the present invention.

Reference is now made to FIG. 4, which is a flowchart of an exemplary process of classifying session events detected during execution of a webpage or application, according to some embodiments of the present invention. An exemplary process 400 may be executed in a system such as the system 200 by a content compliance verifier such as the content compliance verifier 234 executed by a verification server such as the verification server 204. The content compliance verifier 234 may execute the process 400 for classifying an execution session and/or session events detected during one or more execution sessions of one or more content consumption applications such as the content consumption application 232 executed by one or more client devices such as the client device 202.

Figure 5:
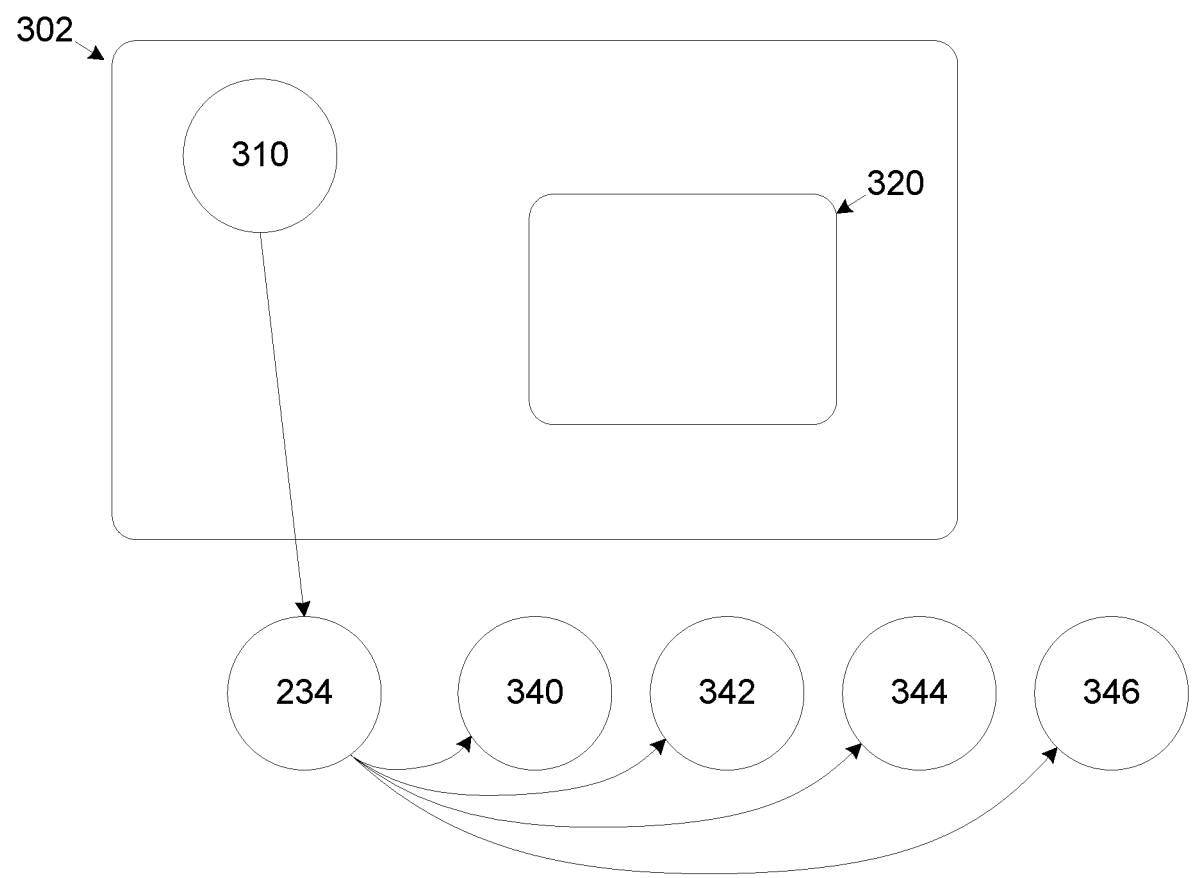
FIG. 5 is a schematic illustration of an exemplary embodiment of interaction between a host monitoring code embedded in a webpage or an application and a remote server for classifying session events detected during execution of the webpage or the application, according to some embodiments of the present invention.

Reference is also made to FIG. 5, which is a schematic illustration of an exemplary embodiment of interaction between a host monitoring code embedded in a webpage or an application and a remote server for classifying session events detected during execution of the webpage or the application, according to some embodiments of the present invention. An exemplary online content such as, for example, the webpage 302 may be loaded from a content server such as the content server 206. The webpage 302 may include code executed by the content consumption application 232, for example, a web browser executed by the client device 202 for generating a presentation for a user such as the user 250 at a display and optionally at an audio interface of the client device 202.

A host monitoring code such as the host monitoring code 310 as described in the process 100 may be embedded in the webpage 302. The webpage 302 may include one or more nesting elements such as the nesting element 320 which may be used for loading nested content, for example, advertisement nested content such as, for example, an AD, a promotion and/or the like from one or more nested content servers such as the nested content server 208, specifically an advertisement nested content server 208. In such case the nesting element 320, for example, an AD space, a banner and/or the like may be used for loading one or more items of the advertisement nested content from the advertisement nested content server 208, i.e. impression.

As shown at 402, the process 400 starts with the content compliance verifier 234 receiving the session data from the host monitoring code 310 embedded in the webpage 302 and executed while the content consumption application 232 executes the code of the webpage 302. The host monitoring code 310 may execute a process such as the process 100 to collect the session data indicative of the execution session of the content consumption application 232.

As described before, the session data received from the host monitoring code 310 comprises one or more of the attributes relating to the execution session of the content consumption application 232, for example, the attribute(s) of the client device 202, the attribute(s) of a user such as the user 250, the attribute(s) of the content loaded from a content server such as the content server 206, the attribute(s) of the nested content loaded from a nested content server such as the nested content server 208, the attribute(s) of a flow of the execution, the presentation attribute(s) of the content and/or the nested content, interaction of the user 250 with the content and/or the nested content and/or the like.

As described in the process 100, the host monitoring code 310 may collect the session data for the execution session itself of the content consumption application 232 and optionally for one or more session events detected during the execution of the content consumption application 232.

A shown at 404, the content compliance verifier 234 may classify the execution session and/or the session event(s) according to one or more predefined classification rules. In particular, the content compliance verifier 234 may classify one or more of the session events which triggered the host monitoring code 310 to transmit the session data (datasets) to the verification server 204. The content compliance verifier 234 may classify the session and/or the session event(s) to one or more classes, for example, a certain user, a certain session type, a certain session occurrence, a certain type of the client device 202, a certain interaction operation initiated by the user 250 and/or the like.

For example, a certain classification rule may dictate classification of a specific execution session to a certain user 250. The content compliance verifier 234 may identify the certain user 250 based on the personal information of the user 250, i.e. one or more of the personal characteristics, interests, preferences and/or the like of the certain user 250 included in the session data received from the host monitoring code 310. Therefore, according to this certain classification rule, the content compliance verifier 234 may classify the specific execution session of the content consumption application 232 according to the certain user 250.

In another example, a certain classification rule may dictate classification of the execution session according to a certain interest of the user 250. The content compliance verifier 234 may identify the certain interest based on the personal interests of the user 250 included in the session data received from the host monitoring code 310. Therefore, according to this certain classification rule, the content compliance verifier 234 may classify the specific execution session of the content consumption application 232 according to the certain interest expressed during the execution session.

In another example, a certain classification rule may dictate classification (or correlation) of a specific execution session to a certain device type of the client device 202. The content compliance verifier 234 may identify the type of the client device 202 based on the operational parameter(s) of the client device 202 included in the session data received from the host monitoring code 310. Therefore, according to this certain classification rule, the content compliance verifier 234 may classify the specific execution session of the content consumption application 232 according to the type of the client device 202.

In another example, a certain classification rule may dictate classification (or correlation) of a specific execution session according to a genre and/or a category of the online content, i.e. the genre or the category of the webpage 302. The content compliance verifier 234 may identify the genre or the category of the webpage 302 based on the characteristic(s) of the content loaded from the content server 206 which may be included in the session data received from the host monitoring code 310. Therefore, according to this certain classification rule, the content compliance verifier 234 may classify the specific execution session of the content consumption application 232 according to the genre of the online content, for example, fashion, sports, travel and/or the like presented by the webpage 302.

In another example, a certain classification rule may dictate classification of the execution session to a certain number of execution sessions in which the online content was loaded from the content server 206 and executed by the content consumption application 232, in particular the number of sessions in which the host monitoring code 310 was executed since deployed in the online content. The content compliance verifier 234 may identify the number of sessions during which the host monitoring code 310 was executed based on the session flow attribute(s) included in the session data received from the host monitoring code 310. Therefore, according to this certain classification rule, the content compliance verifier 234 may classify the specific execution session of the content consumption application 232 according to the number, for example, 3 of previous executions of the host monitoring code 310 by the specific content consumption application 232 executed by the specific client device 202.

In another example, a certain classification rule may dictate classification of the execution session and/or one or more of the session events to one or more certain user interaction operations initiated by the user 250 for interacting with the content consumption application 232. The content compliance verifier 234 may identify the certain user interaction operation(s) based on the interaction attribute(s) included in the session data received from the host monitoring code 310. Therefore, according to this certain classification rule, the content compliance verifier 234 may classify the specific execution session and/or the session event(s) according to the user interaction operation(s), for example, insertion of a certain text, selection of a certain item in the online content and/or the like which are detected during the execution session of a specific content consumption application 232 executed by a specific client device 202.

Additionally and/or alternatively, the content compliance verifier 234 may classify the execution session and/or one or more of the session events according to one or more classification rules defined by one or more machine learning algorithms applied by the content compliance verifier 234. The machine learning algorithm(s) may be applied by the content compliance verifier 234 to a plurality of execution sessions and/or session events extracted from the session data received from a plurality of host monitoring code instances executed by a plurality of client devices 202. Based on the encountered execution sessions and session events, the machine learning algorithm(s) may create a classification scheme which defines one or more of the classification rules for classifying new execution sessions and/or new session events.

As shown at 406, the content compliance verifier 234 may forward the classified execution session and/or one or more of the classified session events to one or more of the AD serving systems associated with one or more advertisers, for example, an advertisement agency, a seller, an online marketplace and/or the like. The AD serving systems may include, for example, an automated bidder such as the automated bidder 232, an AD exchange such as the AD exchange 342, a DSP such as the DSP 344, an SSP such as the SSP 346 and/or the like.

The content compliance verifier 234 may associate the classified execution session and/or the classified session event(s) with the respective unique identifier assigned by the host monitoring code 310 to the respective session data and/or dataset which was used for classifying the execution session and/or the session event(s). This may allow the AD serving system(s) to efficiently identify the specific session to which the classification relates.

The AD serving system(s) may use the classification of the execution session and/or of the session event(s) during the process of evaluation, assessment and/or decision making on whether to bid and/or purchase one or more impression for loading the advertisement nested content to the webpage 302 using the embedded nesting element 320, at what price to bid and/or purchase the impression(s) and/or the like.

For example, assuming that a certain execution session is classified by the content compliance verifier 234 as potentially conducted at a specific client device 202 by one or more of the impersonating software modules, for example, the bot, the robot, the virtual machine, the emulator, the proxy and/or the like. Based on the classification, the AD serving system(s) may avoid biding and/or purchasing impressions at the website 302 for the certain execution session executed by the specific client device 202.

In another example, assuming a certain execution session is classified by the content compliance verifier 234 as a fashion related execution session. The AD serving system(s) may therefore evaluate that bidding for the impression(s) at the webpage 302 for loading ADs relating to fashion items, for example, cloth, shoes, accessories and/or the like may be more effective than loading ADs relating to home appliances and may therefore adapt their decision making accordingly.

In another example, assuming a certain execution session is classified by the content compliance verifier 234 as conducted by a certain type of the mobile device 202, for example, an iPhone. The AD serving system(s) may therefore evaluate that bidding for the impression(s) at the webpage 302 for loading ADs relating to iPhone products may be more effective than loading ADs relating to Android based products and may therefore adapt their decision making accordingly.

In another example, assuming a certain execution session is classified by the content compliance verifier 234 as conducted at a certain geographical location, for example, New York City (NYC). The AD serving system(s) may therefore evaluate that bidding for the impression(s) at the webpage 302 for loading ADs relating to products and/or services available in NYC may be more effective than loading ADs relating to relating to products and/or services available in Las Vegas and may therefore adapt their decision making accordingly.

In another example, assuming a certain execution session is classified by the content compliance verifier 234 as conducted by a certain user 250 who is in an age group of 25-35. The AD serving system(s) may therefore evaluate that bidding for the impression(s) at the webpage 302 for loading ADs relating to products and/or services targeting the 25-35 age group may be more effective than loading ADs relating to relating to products and/or services targeting the 55-75 age group and may therefore adapt their decision making accordingly.

In another example, assuming a certain session event is classified by the content compliance verifier 234 as an interest in certain content presented by the webpage 302, for example, a soccer match. The AD serving system(s) may therefore evaluate that bidding for the impression(s) at the webpage 302 for loading ADs relating to tickets for certain soccer match(s) may be more effective than loading ADs relating to relating to tennis match(s) and may therefore adapt their decision making accordingly.

Optionally, the content compliance verifier 234 calculates a fraud score reflecting reliability and/or legitimacy of the client device 202 and/or for the user 250 by analyzing the session data received from the host monitoring code 310 and/or the classified session events. The higher the fraud score the more likely that the client device 202 and/or for the user 250 are not reliable and/or legitimate while the lower the fraud score the higher is the probability that the client device 202 and/or for the user 250 are reliable, genuine and/or legitimate.

For example, the content compliance verifier 234 may assign a high fraud score to a client device 202 which is in practice the computing node impersonating as one or more legitimate client devices 202. In another example, the content compliance verifier 234 may assign a high fraud score to a client device 202 which utilizes one or more components which may be used in some constellations to disguise the attributes (details) of the user 250 and/or the client device 202, for example, the personal data of the user, the operational parameters of the client device 202 the geographical location of the client device 202 and/or the like. Such components may include, for example, the bot, the robot, the virtual machine, the emulator, the proxy and/or the like. In another example, the content compliance verifier 234 may assign a high fraud score to execution sessions in which the user interaction with the content consumption application 232 and specifically with the nested content does not comply with the user interaction monitored at the user interface 216 of the client device 202. Such incompliance may be indicative of, for example, the robot, the bot and/or the like impersonating as one or more of the users 250.

The content compliance verifier 234 may provide the fraud score available to one or more of the AD serving systems which may use the fraud score calculated for the execution session during the impression(s) bidding and/or purchasing process.

According to some embodiments of the present invention, compliance of the online content, specifically of the nested content is verified, for example, for brand safety, for visibility and/or view-ability and/or for exposure to fraud, in particular fraud relating to the execution environment of the execution sessions, i.e. fraud by the client devices 202.

Figure 6:
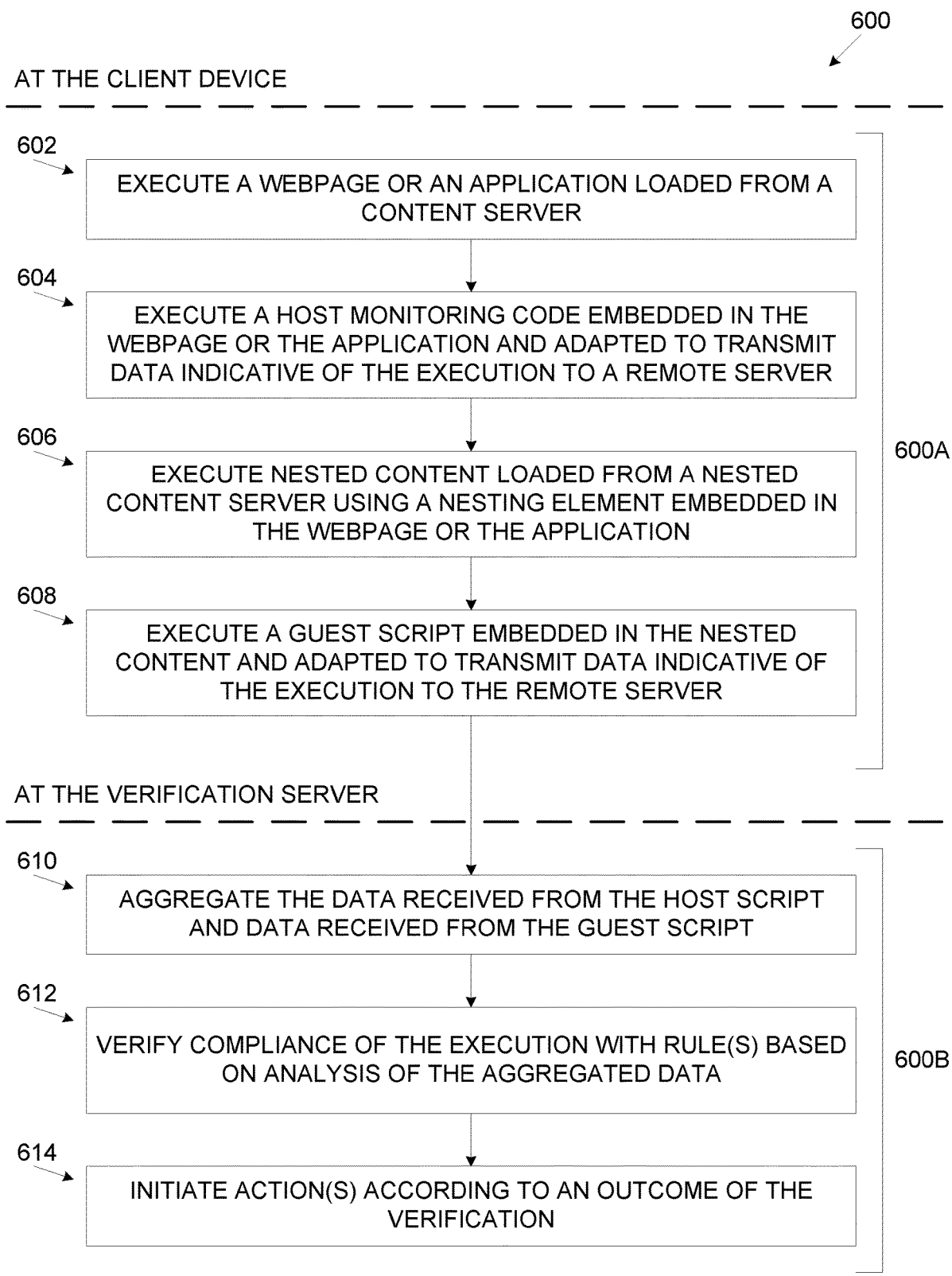
FIG. 6 is a flowchart of an exemplary process of verifying compliance of online content with serving rules, according to some embodiments of the present invention.

Reference is now made to FIG. 6, which is a flowchart of an exemplary process of verifying compliance of online content with serving rules, according to some embodiments of the present invention, according to some embodiments of the present invention. An exemplary process 600 for verifying compliance of online content with one or more serving rules which may be conducted in a system such as the system 200 comprises two sub-process 600A and 600B. The sub-process 600A may be executed by one or more client devices such as the client device 202 while sub-process 600B may be executed by a remote server such as the verification server 204.

Figure 7:
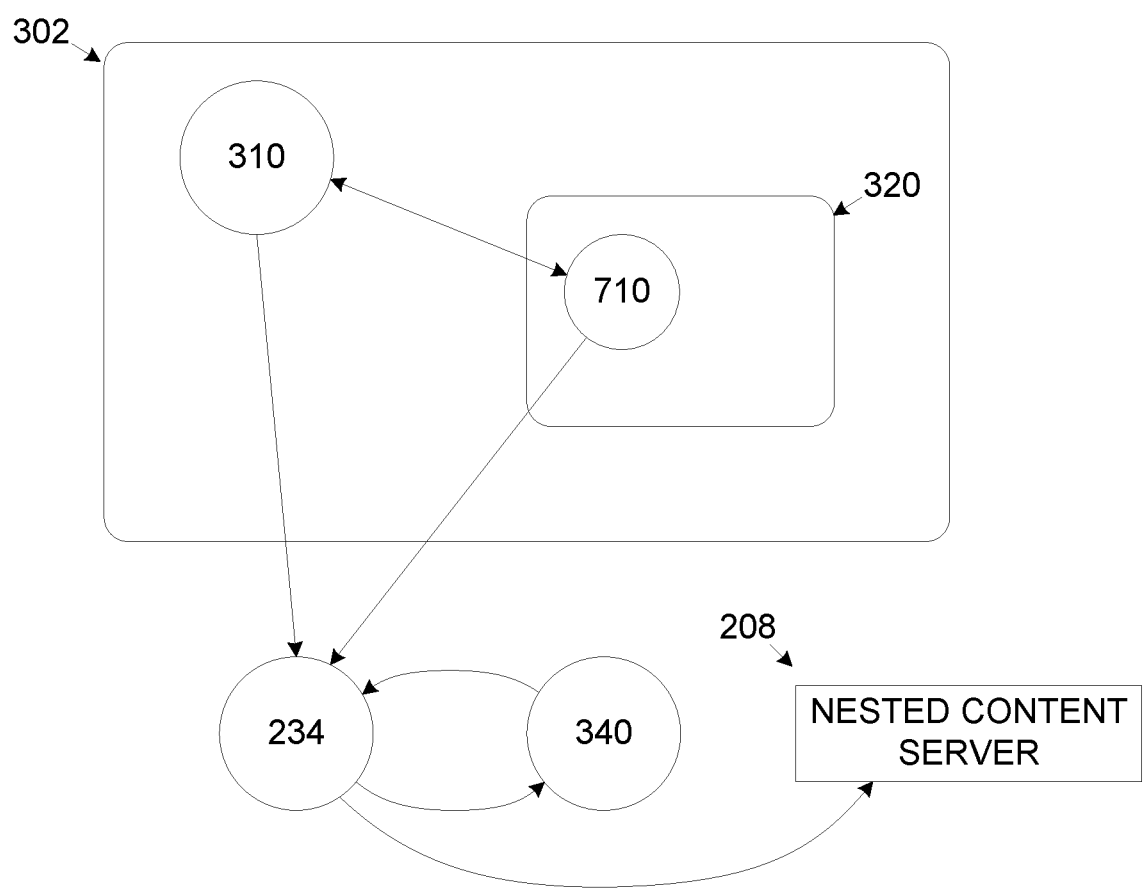
FIG. 7 is a schematic illustration of an exemplary embodiment of interaction relations between exemplary verification elements embedded in online content for verifying compliance of online content, according to some embodiments of the present invention.

Reference is also made to FIG. 7, which is a schematic illustration of an exemplary embodiment of interaction relations between exemplary verification elements embedded in online content for verifying compliance of online content, according to some embodiments of the present invention. An exemplary online content such as, for example, the webpage 302 may be loaded from a content server such as the content server 206. The webpage 302 may include code executed by the content consumption application 232, for example, the web browser executed by the client device 202 for generating a presentation for a user such as the user 250 at a display and optionally at an audio interface of the client device 202.

The webpage 302 may include one or more nesting elements such as the nesting element 320, for example, an iframe, a banner, a window, a window segment and/or the like which may be used for loading the nested content from a nested content server such as the nested content server 208. In particular, the nesting element 320 may be used for loading advertisement nested content, for example, an AD, a promotion and/or the like from one or more advertisement nested content server such as the nested content server 208. In such case the nesting element 320, for example, an AD space, a banner and/or the like may be used for loading one or more items of the advertisement nested content from the advertisement nested content server 208, i.e. an impression.

The process 600 is described for the verification server 204 verifying online content loaded and executed by a single client device 202 from a single content server 206 and a single nested content server 208. However, the description should not be construed as limiting since the verification server 204 may serve to verify the online content for a plurality of client devices 202 which may each execute online content loaded (downloaded) from a plurality of content servers 206 and/or a plurality of nested content servers 208.

As described before, the process 600 comprises the two sub-processes 600A and 600B. The sub-process 600A comprising steps 602, 604, 606 and 608 may be executed by the client device 202 while the sub-process 600B comprising steps 610, 612 and 614 may be executed by the verification server 204.

As shown at 602, similarly to step 102 of the process 100, the sub-process 600A starts with the client device 202, in particular the content consumption application 232, for example, the web browser, the application (e.g. the mobile application) and/or the like loading the online content from the content server 206. The loaded content, for example, the webpage 302 and/or the online content presented by the mobile application may include, for example, HTML code, Java Code, JavaScript code and/or the like. The web browser may execute the loaded code of the webpage 302 to generate the webpage presentation at the display and optionally at the audio output interface(s) (e.g. the speaker(s)) of the client device 202. Similarly, the application may execute the loaded code to generate a presentation of the online content at the display and optionally at the audio output interface(s) of the client device 202.

The online content, for example, the webpage 302 loaded by the content consumption application 232 from the content server 206 may include one or more of the nesting element(s) 320.

As shown at 604, similarly to step 104 of the process 100, while executing the webpage 302, the content consumption application 232 may execute a host monitoring code such as the host monitoring code 310 embedded in the webpage 302.

As described herein above in step 104, the host monitoring code 310 collects session data (referred to herein after as first data) indicative of the execution session of the content consumption application 232. The collected first data may include one or more of the attributes relating to the execution session, for example, the attribute(s) of the client device 202, the attribute(s) of the user 250, the attribute(s) of the content loaded from the content server 206, the attribute(s) of the nested content loaded from the nested content server 208, the attribute(s) of the flow of the execution, the presentation attribute(s) of the content and/or the nested content, the interaction of the user 250 with the content and/or the nested content and/or the like.

As described herein above, the host monitoring code 310 may further verify the user interaction is genuinely initiated by the user 250.

Similarly to the description of the process 100, the host monitoring code 310 may assign the unique identifier to the first data indicative of the execution session. The host monitoring code 310 may also assign the unique identifier to one or more first datasets each associated with a respective session event detected during the execution session.

The host monitoring code 310 transmit the collected first (session) data to the verification server 204, specifically to the content compliance verifier 234.

As described before, in the processes 100 and 400, the nested content may be loaded from the nested content server 208 according to the first (session) data collected by the host monitoring 310 code and/or according to the classification of the execution session and/or classification of the session events done by the content compliance verifier 234. Assuming the nested content includes the advertisement nested content, for example, the AD, the promotion and/or the like which may be loaded from the nested content server 208 associated with the advertiser(s). In such case, one or more of the AD serving systems may select the advertisement nested content loaded from the nested content server 208 according to the first (session) data and/or according to the classification.

For example, the advertisement nested content may be selected according to the attributes of the online content. For example, assuming that based on the first data and/or based on the classification made by the content compliance verifier 234, the webpage 302 is classified as a webpage of a fashion website. Based on the first data and/or the classification, the AD serving systems may select to bid and in an attempt to purchase one or more impressions for AD(s) offering one or more fashion items and/or comprising a link to a fashion related website.

In another example, the advertisement nested content may be selected according to the personal characteristics of the user 250. For example, assuming that based on the first data and/or based on the classification made by the content compliance verifier 234, the user 250 is a single female in the age of 28. Based on the first data and/or the classification, the AD serving systems may therefore select to bid in an attempt to purchase one or more impressions for AD(s) offering social activates for females in the age group of 25-35.

In another example, the advertisement nested content may be selected according to the operational parameters of the client device 202. For example, assuming that based on the first data and/or based on the classification made by the content compliance verifier 234, the client device 202 is currently located in the certain geographical area. Based on the first data and/or the classification, the AD serving systems may therefore select to bid in an attempt to purchase one or more impressions for AD(s) offering products and/or services targeting the certain geographical location.

In another example, the advertisement nested content may be selected according to the interaction of the user 250 with the content consumption application 232, specifically interaction with the online content, e.g. the webpage 302. For example, assuming that based on the classification made by the content compliance verifier 234, the user 250 is determined to currently view an online tourism webpage and selects to view an article relating to, for example, a certain traveling destination (e.g. the Caribbean Islands). Based on the classification, the AD serving systems may therefore select to bid in an attempt to purchase one or more impressions for AD(s) offering, for example, a cruise to the Caribbean Islands.

As shown at 606, after the nested content, for example, the advertisement nested content is loaded from the nested content server 208 using the nesting element 320, the content consumption application 232 may execute the code of the nested content, for example, HTML code, Java Code, JavaScript and/or the like. In case of the web browser content consumption application 232, the web browser may execute the code of the nested content loaded to the webpage 302 to generate the webpage presentation at the display and optionally at the audio output interface(s) (e.g. the speaker(s)) of the client device 202. Similarly, in the case of the application content consumption application 232, the application may execute the code included in the loaded nested content to generate a presentation of the content at the display and optionally at the audio output interface(s) of the client device 202.

The nested content may typically be executed in the context of the nesting element 320, for example, within the context of the iframe.

As shown at 608, while executing the code of the nested content, for example the advertisement nested content, the content consumption application 232 may execute a guest monitoring code 710 embedded in the advertisement nested content loaded using the nesting element 320 embedded in the webpage 302. A plurality of implementation may be applied to embed the host script in the webpage or the application. In the case of the web browser executing the webpage 302, the guest monitoring code 710 may be embedded, for example, in the iframe nesting element 320 in the webpage 302, as a JavaScript embedded in the nested content and/or the like. In the case of the application, the guest monitoring code 710 may be embedded, for example, as a JavaScript in the nested content which may be executed within a nesting element such the nesting element 320 embedded in the application. The guest monitoring code 710 may typically be embedded in the nested content by the nested content provider, for example, the advertiser, the seller, a publisher of the online data and/or the like which uses the nested content server 208 to serve the online content, in particular the nested content, to the client device 202.

Similarly to the host monitoring code 310, the guest monitoring code 710 may collect session data (referred to herein after as second data) indicative of the execution session of the content consumption application 232. The second (session) data may be very similar to the first (session) data and may comprise one or more of the attributes included in the first data. As such the guest monitoring code 710 may apply one or more of the methods, techniques and/or implementations for obtaining the second data. The second data may further include one or more additional attributes relating to the nested content, for example, an identification of the nested content, an identification of the nested content provider, an essence of the nested content, a presentation attribute of the nested content, interaction of the user with the nested content and/or the like.

However, there may be a difference between the attributes described in the first data and the second data as the host monitoring code 310 and the guest monitoring code 710 are executed in different contexts. Specifically, the host monitoring code 310 may be executed in the context of the webpage 302 while the guest monitoring code 710 may be executed in the context of the nesting element 320, for example, the iframe. The host monitoring code 310 may therefore not be able to collect data of one or more attributes collected by the guest monitoring code 710 and included in the second (session) data and vice versa, the guest monitoring code 710 may not be able to collect data of one or more attributes collected by the host monitoring code 310 and included in the first (session) data.

The guest monitoring code 710 may further reflect in the second data the unique identifier initially assigned by the host monitoring code 310 to the first data which was used for selecting the nested content. This is possible due to the fact that the nested content was selected according to the specific first data (or a specific first data dataset) which is associated with a specific unique identifier. The specific unique identifier may propagate through the process of selecting and loading the selected nested content to the content consumption application 232 and the guest monitoring code 710 embedded in the selected nested content may therefore have access to the specific unique identifier. As such the unique identifier may serve to accurately correlate between the first data and the corresponding second data.

The guest monitoring code 710 may transmit the collected second (session) data to the verification server 204, specifically to the content compliance verifier 234.

Optionally, the host monitoring code 310 and the guest monitoring code 710 communicate with each other using one or more communication protocols supported by the content consumption application 232, for example, the web browser loading and executing the webpage and/or the application. This communication may allow the host monitoring code 310 or the guest monitoring code 710 to serve as a relay for the other and transfer data of the other to the compliance verifier 234. This way only one of the host monitoring code 310 and the guest monitoring code 710 may directly communicate with the content compliance verifier 234 thus reducing network bandwidth, complexity and/or the like.

As shown at 610, the sub-process 600B executed by the verification server 204, specifically by the content compliance verifier 234, starts with aggregating, for example, combining between the first data and the second data received from the host monitoring code 310 and the guest monitoring code 710 respectively.

The content compliance verifier 234 may use the identifiers included in the first data and the second data to accurately correlate between them and further correlate them with a specific execution session of a specific content consumption application 232 at a specific client device 202 and/or with a specific session event detected during the execution session of the specific content consumption application 232.

Since the host monitoring code 310 and the guest monitoring code 710 may execute in a different context within the online content, for example, the webpage 302, the first data and the second data may differ from each other.

The attributes described in the first data and the second data may therefore each provide a partial view of the overall presentation of the nested content. For example, since the guest monitoring code 710 executes in the context of the nesting element 320, the guest monitoring code 710 may not have access to one or more attributes of the online content, for example, the webpage 302 and/or other nested content items loaded to the webpage 302. Such attributes which may not be accessible to the guest monitoring code 710 may therefore not be included in the second data. The host monitoring code 310 on the other hand may have access to such attributes and may therefore include them in the first data. In another example, due to security measures typically applied by one or more content consumption applications 232, the host monitoring code 310 operating in the context of webpage 320 may not have access to the nested contents loaded using the nesting element 320. The host monitoring code 310 may therefore be unable to collect one or more of the attributes indicative of the nested content. The guest monitoring code 710, on the other hand, executes in the context of the nesting element 320 and may therefore be able to collect data relating to such attribute(s) and may include them in the second data.

For example, the host monitoring code 310 may be unable to collect some of the content attributes, for example, the type, the content interpretation and/or other attributes relating to the nested content. The guest monitoring code 710 on the other hand may be able to collect such data as it may have access to the nested content.

In another example, the guest monitoring code 710 may be able to collect some presentation attributes of the nested content, for example, a window size, a font size and/or the like. However, the guest monitoring code 710 may not be able to detect other presentation attributes of the nested content, for example, a location of the nested content within the webpage 302, is the nested content in the visible sections of the presentation presented at the display, is the nested content is at least partially covered by other content of the webpage 302, is the nested content at least partially transparent and/or the like.

In another example, assuming the nested content is presented using the nesting element 320 and another nested content item is presented in another nesting element 320. The guest monitoring code 710 may not be able to collect attributes relating to the other nested content. The host monitoring code 310, on the other hand, under some restrictions may have access to at least some attributes of the other nested content. For example, using one or more of the NLP tools, the host monitoring code 310 may identify at least some content attributes, for example, a type of the other nested content, linguistic interpretation of the other nested content and/or the like.

In another example, the guest monitoring code 710 may not be able to collect attribute's data relating to operational parameters of the client device 202, for example, the type, the display size, the display resolution, the storage resources availability, the computing resources availability, the network resources availability, the current geographical location and/or the like. Such attributes may therefore not be included in the second data. However, the host monitoring code 310 may collect such attributes and include them in the first data.

In another example, the host monitoring code 310 may verify that user interaction with the online content, in particular with the nested content is genuinely initiated by the user 250. Therefore, while able to identify user interaction with the nested content, the guest monitoring code 710 may not be able to identify whether the interaction is indeed initiated by the user 250 or by one or more software modules, for example, a bot, a robot, a virtual machine, an emulator, a proxy and/or the like which imitate the user interaction by interacting with the API of the content consumption application 232.

Therefore, by aggregating the corresponding first data and second data and analyzing the combined data, the content compliance verifier 234 may fabricate an enhanced comprehensive view of the nested content, in particular with respect to the presentation of the nested content to the user 250 using the client device 202.

As shown in 612, based on the analysis of the aggregated (session) data, the content compliance verifier 234 verifies compliance of the execution, presentation, user interaction and/or the like with respect to the nested content according to one or more serving rules associated with the nested content.

In particular, the compliance verification is directed at brand safety, visibility (view ability) and/or fraud relating to the nested content. Brand safety may relate to appropriateness, suitability, relevance and/or any other aspect of a webpage such as the webpage 302 or the application for hosting the loaded nested content, for example, the advertisement nested content. The visibility may relate to view ability of the nested content within the webpage 302 or the application according to one or more presentation attributes of the nested content within the webpage 302 or the application, for example, a layout, an arrangement, a location, a transparency, an obscurity, coverage (or partial coverage) by other content presented in the webpage 302 or the application and/or the like. Fraud detection may be identified based on one or more attributes identified for the client device 202, for example, reliability, legitimacy, relevancy, genuine interaction of user 250 with the client device 202 and/or the like.

The serving rules may therefor target various aspects of the execution session, such as the client device 202, the user 250, the online content, the nested content, the user interaction and/or the like as expressed by the attributes identified in the aggregated (session) data and/or as expressed in the classification done by the content compliance verifier 234.

The compliance verification according to the serving rules may be of particular value for advertisement nested content since the advertiser(s) may invest significant funds for purchasing the impressions for the advertisement nested content. The content verification may allow the advertiser(s) to verify that the advertisement nested content was served to trusted and reliable client devices 202 and was properly presented to the user 250 using the client device 202.

The serving rules may be defined for specific items of the advertisement nested content, for example, specific ADs and/or to groups of advertisement nested content, for example, ADs targeting a specific product type, ADs targeting a specific service type, ADs targeting product(s) and/or service(s) of a specific seller, ADs targeting a specific market segment and/or the like.

The serving rules defined for compliance verification relating to fraud detection may include, for example, a certain serving rule defined for a certain AD may dictate that the AD should be presented in execution sessions conducted by client devices 202 of a certain type, for example, a mobile device (e.g. a Smartphone, a tablet, a laptop, etc.) and/or the like rather than by a computing node impersonating as a legitimate client device 202. In another example, a certain serving rule defined for a certain AD may dictate that the AD should be presented in execution sessions conducted by legitimate client devices 202 in which the user interaction is identified to be initiated by the user 250.

The serving rules defined for compliance verification relating to brand safety of the nested content may include, for example, a certain serving rule defined for a certain AD of a product and/or a service targeting young children may dictate that the certain AD may not be presented in an adult's only website. In another example, a certain serving rule defined for a certain AD may dictate that the AD should be presented to users 250 between the ages of 20-30. In another example, a certain serving rule defined for a certain AD may dictate that the AD should be presented for client devices 202 located in a certain geographical area.

The serving rules defined for compliance verification relating to visibility (view ability) of the nested content may include, for example, a certain serving rule defined for a certain AD may dictate that the AD should be presented for client devices 202 having a display larger than a minimum display size. In another example, a certain serving rule defined for certain ADs comprising English text may dictate that the certain ADs may not be presented in websites which are presented in languages other than English. In another example, a certain serving rule defined for a certain AD may dictate that the window size allocated for presenting the certain AD must be larger than a certain minimum window size. In another example, a certain serving rule defined for a certain AD may dictate that the certain AD must not be even partially covered by other content presented during execution of the webpage or the application. In another example, a certain serving rule defined for a certain AD may dictate that text of the certain AD must have a certain minimum text font size.

As shown at 614, the content compliance verifier 234 may initiate one or more actions according to the verification of the content compliance.

For example, in case the presentation of the nested content fails to comply with one or more of the serving rules, the content compliance verifier 234 may transmit one or more notifications to the nested content server 208, to the nested content provider associated with the nested content server 208 and/or the like. The notifications may identify, for example, the incompliance, the client device 202, one or more of the attributes of the execution session and/or the like.

Optionally, the content compliance verifier 234 calculates a fraud score reflecting reliability and/or legitimacy of the client device 202 and/or for the user 250 as described herein above. However, while in the process 400 the content compliance verifier 234 may use only the session data available from the host monitoring code 310, in the verification process 600, the content compliance verifier 234 may analyze the aggregated (session) data to calculate the fraud score. As such the fraud score may be more accurate as the aggregated data may provide an enhanced, more complete and/or more comprehensive conception of the execution session. Moreover, the content compliance verifier 234 may adjust the fraud score of a certain client device 202 and/or of a certain user 250 according to analysis of the aggregated (session) data collected during a plurality of execution sessions of the content consumption application 232.

As described before, the higher the fraud score the more likely that the client device 202 and/or for the user 250 are not reliable while the lower the fraud score the higher is the probability that the client device 202 and/or for the user 250 are reliable, genuine and/or legitimate.

The content compliance verifier 234 may calculate the fraud score as described before in the process 400, however due to the comprehensiveness of the aggregated data, by analyzing the aggregated data the content compliance verifier 234 may more accurately calculate the fraud score. For example, the aggregated data may include session data received from guest monitoring code 710 which is not available to the host monitoring code 310, specifically attributes relating to the nested content, specifically the advertisement nested content. For example, an identification of the nested content, an identification of the provider of the nested content, a category of the nested content and/or the like. For example, the content compliance verifier 234 may assign a high fraud score to a client device 202 which is in practice the computing node impersonating as one or more legitimate client devices 202. In another example, the content compliance verifier 234 may assign a high fraud score to a client device 202 which utilizes one or more components which may be used in some constellations to disguise the attributes (details) of the user 250 and/or the client device 202, for example, the personal data of the user, the operational parameters of the client device 202 the geographical location of the client device 202 and/or the like. Such components may include, for example, the bot, the robot, the virtual machine, the emulator, the proxy and/or the like. In another example, the content compliance verifier 234 may assign a high fraud score to execution sessions in which the user interaction with the content consumption application 232 and specifically with the nested content does not comply with the user interaction monitored at the user interface 216 of the client device 202. Such incompliance may be indicative of, for example, the robot, the bot and/or the like impersonating as one or more of the users 250.

The content compliance verifier 234 may forward (transmit) the calculated fraud score to the nested content server 208 and/or to one or more of the AD serving systems. For example, one or more automated bidders such as the automated bidder 340 may request the fraud score calculated for a certain client device 202 and/or a certain user 250 before placing bids for purchasing impression(s) at a certain execution session of the content consumption application 232 on the certain client device 202. The automated bidder 340 may use the fraud score during the decision process of whether and at what price to purchase the impressions for the certain execution session.

As described herein above, the host monitoring code 310 and the guest monitoring code 710 may optionally be capable of communicating with each other using one or more communication protocols supported by the content consumption application 232 such as the web browser executing the webpage 302 and/or the application.

The communication between the host monitoring code 310 and the guest monitoring code 710 may allow taking some actions in real time with respect to the presented nested content. For example, a control code, for example, a script and/or the like embedded in the nested content and adapted to control the nested content, for example, loading, presenting, adjusting and or the like may interact with the guest monitoring code 710 also embedded in the nested content. The control code may thus use the first data (or part thereof) received from the host monitoring code 310 and optionally the second data (or part thereof) received from the guest monitoring code 710 to determine if and/or how to control the nested content. For example, based on the first and/or second data received, the control code may prevent (block) loading and/or presentation of the nested content. In another example, assuming the nested content is advertisement nested content, for example, a certain AD the control code may disable a link activated by selecting, clicking and/or hovering over the AD.

For example, the guest monitoring code 710 may prevent presentation of a certain nested content in case, based on analysis of the first data, the guest monitoring code 710 determines that the client device 202 is not a legitimate client device 202 but rather the processing node impersonating as one or more of the client devices 202.

In another example, the guest monitoring code 710 may prevent presentation of a certain nested content in case, based on analysis of the first data, the online content loaded from the content server 206 is determined to be inappropriate, irrelevant and/or otherwise improper according to one or more of the serving rules.

In another example, the guest monitoring code 710 may prevent presentation of a certain nested content in case, based on analysis of the first data, the content consumption application 232 is determined to employ an AD blocking feature.

Figure 8:
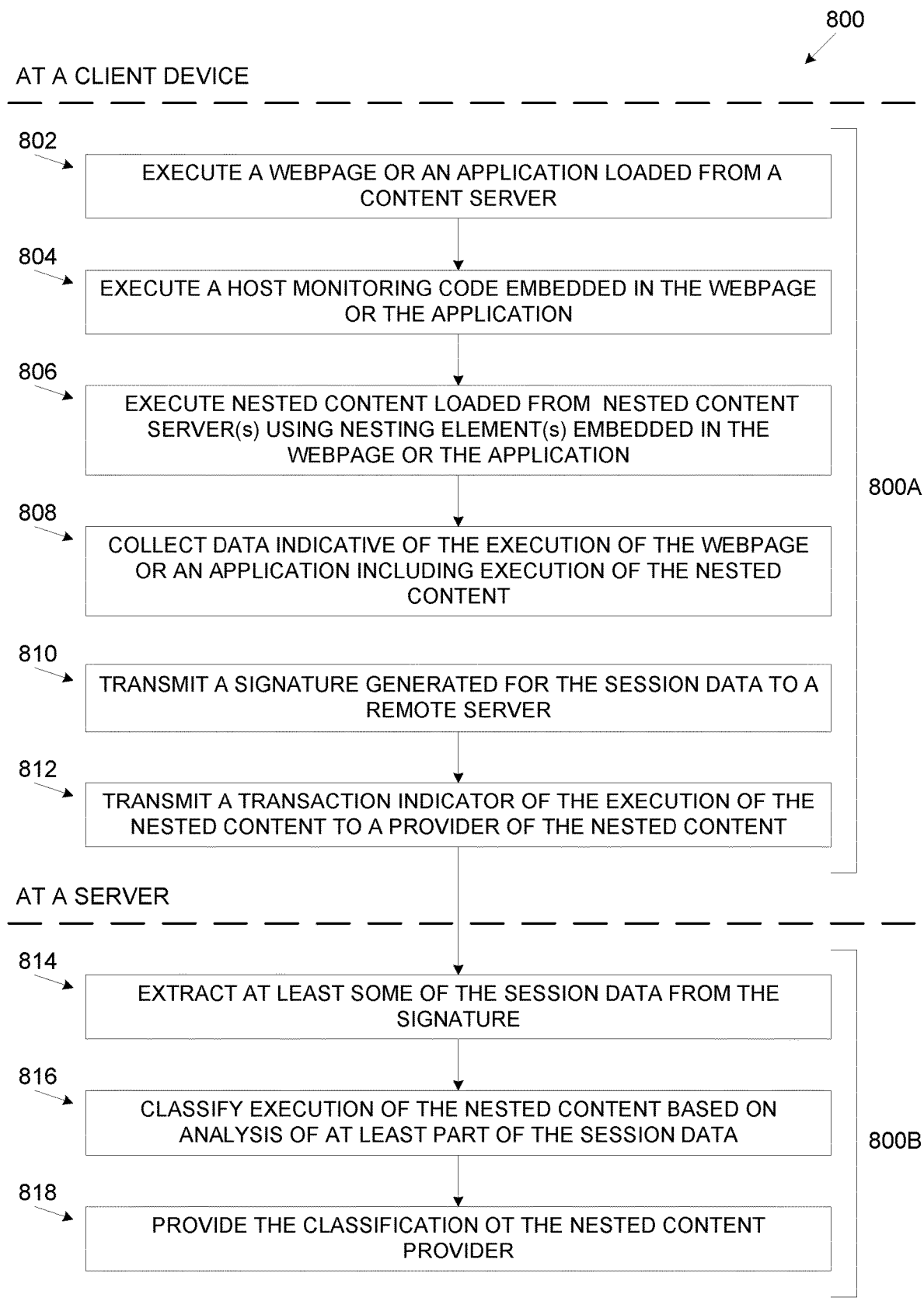
FIG. 8 is a flowchart of an exemplary process of classifying execution of nested content loaded in a webpage or an application, according to some embodiments of the present invention.

Reference is now made to FIG. 8, which is a flowchart of an exemplary process of classifying execution of nested content loaded in a webpage or an application, according to some embodiments of the present invention.

An exemplary process 800 may be executed in a system such as the system 200 to classify execution of nested content loaded into a webpage or an application executed by a client device such as the client device 202. The process 800 may include two sub-process, a first sub-process 800A executed by one or more client devices such as the client device 202 and a second sub-process 800B may be executed by a remote server, for example, a server, a computing node, a cluster of computing nodes, a cloud service, a cloud platform and/or the like. For example, the sub-process 800B may be executed by a verification server such as the verification server 204, specifically by an execution classifier 236 software module executed by processor(s) such as the processor(s) 222 of the verification server 204.

The process 800 is described for a single verification server 204 classifying execution of online content loaded and executed by a single client device 202 from a single content server 206 and a single nested content server 208. However, the description should not be construed as limiting since the verification server 204 may serve to classify execution of online content loaded and executed by a plurality of client devices 202 which may each execute online content loaded (downloaded) from a plurality of content servers 206 and/or a plurality of nested content servers 208.

As shown at 802, the sub-process 800A executed by the client device 202, starts with the client device 202, in particular a content consumption application such as the content consumption application 232 loading online content from the content server 206. The loaded online content, for example, the webpage 302 and/or the online content loaded by the application may include, for example, HTML code, Java Code, JavaScript code and/or the like. The content consumption application 232, for example, the web browser may execute the loaded code of the webpage 302 to generate the webpage presentation at the display and optionally at the audio output interface(s) of the client device 202. In another example, the content consumption application 232, specifically the application (e.g. mobile application), for example, an Over the Top (OTT) application, a Connected TV (CTV) application and/or the like may load online content and generate a presentation of the online content at the display and optionally at the audio output interface(s) of the client device 202.

The online content loaded by the content consumption application 232 from the content server 206 or by the mobile application executed by the client device 202 may include one or more of the nesting element(s) 320, for example, an iframe and/or the like which may be used to load nested content from one or more nested content servers such as the nested content server 208.

As shown at 804, similarly to step 104 of the process 100, while the content consumption application 232 executing the webpage 302 or while the mobile application is executed, the consumption application 232 or the mobile application may execute a host monitoring code such as the host monitoring code 310 embedded in the webpage 302 or in the mobile application.

The host monitoring code may be typically embedded in the webpage and/or in the application using an SDK. Proving the SDK for embedding, integrating and/or including the host monitoring code in the application may significantly reduce effort, cost and/or time required by the webpage or the application vendor and/or developer to embed the host monitoring code in the webpage and/or in the application.

As shown at 806, the content consumption application 232 may execute nested content, for example, HTML code, Java Code, JavaScript and/or the like loaded from one or more of the nested content servers 208 using one or more of the nesting elements 320 embedded in the webpage or in the application.

The nested content loaded form the nested content server(s) 208 may include, for example, advertisement nested content loaded from one or more advertisement nested content servers 208. In such case the nesting element(s) 320, for example, an AD space, a banner and/or the like may be used for loading one or more items of the advertisement nested content from the nested content server 208, i.e. one or more impressions.

In case of the web browser content consumption application 232, the web browser may execute the code of the nested content loaded to the webpage 302 to generate the webpage presentation at the display and optionally at the audio output interface(s) of the client device 202. Similarly, in the case of the application content consumption application 232, the application may execute the code included in the loaded nested content to generate a presentation of the content at the display and optionally at the audio output interface(s) of the client device 202.

The nested content may typically be executed in the context of the nesting element 320, for example, within the context of the iframe.

As shown at 808, and similarly to as described herein above in step 104, the host monitoring code 310 may collect the session data indicative of the execution session of the content consumption application 232 with respect to both the execution of the online content executed as well as to the execution of the nested content. The session data may therefore include, for example, the attribute(s) of the client device 202, the attribute(s) of the user 250, the attribute(s) of the content loaded from the content server 206, the attribute(s) of the nested content loaded from the nested content server 208, the attribute(s) of the flow of the execution, the presentation attribute(s) of the content and/or the nested content, the interaction of the user 250 with the content and/or the nested content and/or the like.

As shown at 810, the host monitoring code 310 may transmit, in real-time during the execution of the webpage and/or the application, a signature generated for the session data and/or part thereof to one or more remote servers, for example, the verification server 204.

The host monitoring code 310 may generate the signature to compact and reduce the size of the session data or part thereof. The signature may significantly reduce the volume of the session data thus significantly reducing the computing resources required for processing and/or transmitting the session data to the verification server 204, for example, processing resources, storage resources and in particular networking resources such as, for example, bandwidth, latency and/or the like.

Optionally, the host monitoring code 310 encrypts the signature according to one or more cryptographic algorithms as known in the art using one or more secret cryptographic keys. Encrypting the signature may significantly increase robustness and/or immunity of the signature to tampering by one or more malicious parties which may try to manipulate the signature in attempt to deceive the verification server 204.

As shown at 812, the host monitoring code 310 may transmit, in real-time during the execution of the webpage and/or the application, one or more transaction indicators indicative of the execution of the nested content to one or more of the providers of the nested content to indicate that the nested content and/or part therefore are and/or were executed, specifically within the context of the webpage or the application during the execution session documented by the session data and the signature. In particular, the host monitoring code 310 may transmit the transaction indicator(s) to a server, a service, a platform and/or the like associated with the nested content provider(s).

The host monitoring code 310 may transmit the transaction indicator(s) to the nested content provider(s) according to one or more communication protocol as known in the art, specifically online content communication protocols for online content communication established with the nested content provider(s). Such online content communication protocols used for content consumption, reporting, logging and/or the like may include, for example, Video Ad Serving Template (VAST), web beacon and/or the like. Employing industry standard online communication protocols may serve for simple and easy integration and adaption of the webpage and/or application as well as the servers and/or services used by the nested content provider(s) which may need little and potentially no alteration and/or adaptation to enable reception of the transaction indicator(s).

Moreover, the host monitoring code 310 may provide the signature to the webpage and/or the application executed by the client device 202 which may be in communication with the nested content provider(s) such that the webpage and/or the application may integrate the signature into a communication stream, for example, a message, a packet and/or the like transmitted to the nested content provider(s). To support this, the host monitoring code 310 may construct each transaction indicator to according to the communication protocol(s) established with the nested content provider(s).

The host monitoring code 310 may further assign a unique identifier to the execution session which may be included in both the signature and in each of the transaction indicator(s) to correlate between the execution session documented by the session data and the signature and the transaction indicator(s).

As shown at 814, the sub-process 800B executed by the verification server 204, specifically by the execution classifier 236 extracting the session data and/or part thereof from the signature received form the client device 202.

In case the signature is encrypted, the execution classifier 236 may decrypt the signature using the secret cryptographic key(s) used by the host monitoring code 310 to encrypt the signature. This means that secret cryptographic key(s) used by the host monitoring code 310 are also available to the execution classifier 236.

As shown at 816, the execution classifier 236 may classify the execution session based on analysis of at least part of the session data extracted from the signature, specifically according to one or more of the attributes included in the session data, for example, the attribute(s) of the client device 202, the attribute(s) of the user 250, the attribute(s) of the content loaded from the content server 206, the attribute(s) of the nested content loaded from the nested content server 208, the attribute(s) of the flow of the execution, the presentation attribute(s) of the content and/or the nested content, the interaction of the user 250 with the content and/or the nested content and/or the like.

The execution classifier 236 may classify the execution session and/or one or more of the session events detected during the execution session based on analysis of the session data and/or part thereof according to one or more of the predefined classification rules and optionally according to one or more of the learned classification rules learned by the machine learning algorithm(s).

As shown at 818, the execution classifier 236 may provide the execution classification of the execution session to one or more of the nested content providers which may use the classification to verify proper execution of their nested content, specifically in the context of the webpage or the application executed by the client device 202.

In particular, in response to receiving a respective transaction indicator from the host monitoring code 310, one or more of the nested content providers may communicate with the verification server 204, specifically with the execution classifier 236 to obtain the classification of the execution session, in particular with respect to the nested content loaded during the execution session form one or more of the nested content servers 208 associated with the respective nested content provider.

When communicating with the execution classifier 236, each nested content provider may use the unique identifier extracted from the respective transaction indicator to indicate to the execution classifier 236 of the required execution classification created for the respective execution session correlated by the unique identifier with the respective transaction indicator.

The execution classifier 236 may then respond and provide the respective nested content provider the classification of the execution session correlated with the respective transaction indicator.

The nested content provider(s) may analyze the classification of the execution session which may reflect one or more of the attributes of the execution session, specifically with respect to the nested content and verify its compliance with one or more of the serving rules which target various aspects of the execution session, such as, for example, the client device 202, the user 250, the online content, the nested content, the user interaction and/or the like as expressed by the attributes identified in the session data and/or as expressed in the classification made by the execution classifier 236.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms nesting element, RTB protocol and online content communication protocol are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computerized method of classifying nested content execution loaded by a webpage or an application executed by a client device, comprising:
   using at least one processor of a client device for:
   executing a webpage or an application loaded from a content server, the webpage or the application embeds at least one nesting element used for loading nested content from at least one nested content server, the webpage or the application embeds a host monitoring code;
   executing the host monitoring code in context of the webpage or the application for:
   collecting session data indicative of an execution session of the webpage or the application including execution of nested content loaded using the at least one nesting element, the context of execution of the webpage or the application is inaccessible from the context of execution of the nested content;
   transmitting, in real-time, a signature generated for the session data to at least one verification server configured to classify the execution of the nested content according to at least part of the session data extracted from the signature; and
   transmitting, in real-time, at least one transaction indicator of execution of the nested content to at least one provider of the nested content to enable the at least one nested content provider to verify execution of the nested content according to at least one serving rule based on the execution classification obtained from the at least one verification server.

2. The computerized method of claim 1, wherein the at least one verification server classifies the execution session and/or at least one session event detected during the execution session based on an analysis of the collected session data extracted from the signature according to at least one classification rule.

3. The computerized method of claim 1, wherein the host monitoring code includes a unique identifier in the signature and in the at least one transaction indicator to correlate between the signature of the execution session and the at least one transaction indicator.

4. The computerized method of claim 3, wherein, in response to receiving the at least one transaction indicator, the at least one nested content provider obtains the execution classification from the at least one verification server to verify execution of the nested content, the at least one nested content provider provides the unique identifier to the at least one verification server to indicate the required execution classification.

5. The computerized method of claim 4, wherein execution verification relates to compliance of the execution as reflected by the classification with at least one serving rule defined for the nested content.

6. The computerized method of claim 1, wherein the host monitoring code transmits the at least one transaction indicator according to at least one communication protocol established with the at least one nested content provider.

7. The computerized method of claim 6, wherein the at least one communication protocol comprises Video Ad Serving Template (VAST).

8. The computerized method of claim 6, wherein the at least one communication protocol comprises at least one web beacon.

9. The computerized method of claim 1, further comprising the host monitoring code encrypts the signature according to at least one cryptographic algorithm using at least one secret cryptographic key.

10. The computerized method of claim 1, wherein the session data comprises at least one attribute of a group consisting of: an attribute of the client device, an attribute of a user of the client device, an attribute of the webpage or the application, an attribute of interaction of the user of the client device with the webpage or the application and a presentation attribute of the webpage or the application.

11. The computerized method of claim 1, wherein the at least one nesting element comprises an iframe.

12. The computerized method of claim 1, wherein the host monitoring code is embedded in the webpage or the application using at least one Software Development Kit (SDK).

13. A client device for supporting classification of execution of nested content loaded by a webpage or an application executed by a client device, comprising:
- at least one processor for executing a code, the code comprising:
- code instructions to execute a webpage or an application loaded from a content server, the webpage or the application embeds at least one nesting element used for loading nested content from at least one nested content server, the webpage or the application embeds a host monitoring code;
- code instructions to execute the host monitoring code in the context of the webpage or the application, the host monitoring code comprising:
- code instructions to collect session data indicative of an execution session of the webpage or the application including execution of nested content loaded using the at least one nesting element, the context of execution of the webpage or the application is inaccessible from the context of execution of the nested content;
- code instructions to transmit, in real-time, a signature generated the session data to at least one verification server configured to classify the execution of the nested content according to at least part of the session data extracted from the signature; and
- code instructions to transmit, in real-time, at least one transaction indicator of execution of the nested content to at least one provider of the nested content to enable the at least one nested content provider to verify execution of the nested content according to at least one serving rule based on the execution classification obtained from the at least one verification server.

14. A computerized method of classifying nested content execution loaded by a webpage or an application executed by a client device, comprising:
- using at least one processor of a server for:
- receiving a signature of session data indicative of an execution session of a webpage or an application by a client device including execution of nested content loaded from at least one nested content server using at least one nesting element embedded in the context of the webpage or the application, the signature is generated, in real-time, by a host monitoring code executed in context of execution of the webpage or the application, the context of execution of the webpage or the application is inaccessible from the context of execution of the nested content;
- extracting the session data from the signature;
- classifying the execution of the nested content according to the at least part of the session data; and
- providing the nested content execution classification to at least one provider of the nested content to enable the at least one nested content provider to verify execution of the nested content according to at least one serving rule based on the execution classification;
- wherein the at least one nested content provider is informed of the execution of the nested content in real-time by the host monitoring code.

15. A system for classifying nested content execution loaded by a webpage or an application executed by a client device, comprising:
- at least one processor for executing a code, the code comprising:
- code instructions to receive a signature of at least some session data indicative of an execution session of a webpage or an application by a client device including execution of nested content loaded from at least one nested content server using at least one nesting element embedded in the webpage or the application, the signature is generated, in real-time, by a host monitoring code executed in context of execution of the webpage or the application, the context of execution of the webpage or the application is inaccessible from the context of execution of the nested content;
- code instructions to extract the session data from the signature;
- code instructions to classify the execution of the nested content according to the at least part of the session data; and
- code instructions to provide the nested content execution classification to at least one provider of the nested content to enable the at least one nested content provider to verify execution of the nested content according to at least one serving rule based on the execution classification;
- wherein the at least one nested content provider is informed of the execution of the nested content in real-time by the host monitoring code.

* * * * *